United States Patent
Kawasaki et al.

(10) Patent No.: US 12,194,573 B2
(45) Date of Patent: Jan. 14, 2025

(54) SOLDER PASTE

(71) Applicant: SENJU METAL INDUSTRY CO., LTD., Tokyo (JP)

(72) Inventors: Hiroyoshi Kawasaki, Tokyo (JP); Masato Shiratori, Tokyo (JP); Yuji Kawamata, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 544 days.

(21) Appl. No.: 17/424,405

(22) PCT Filed: Mar. 27, 2020

(86) PCT No.: PCT/JP2020/013920
§ 371 (c)(1),
(2) Date: Jul. 20, 2021

(87) PCT Pub. No.: WO2020/203730
PCT Pub. Date: Oct. 8, 2020

(65) Prior Publication Data
US 2022/0088725 A1    Mar. 24, 2022

(30) Foreign Application Priority Data

Mar. 29, 2019 (JP) ................. 2019-068338

(51) Int. Cl.
*B23K 35/362* (2006.01)
*B23K 35/02* (2006.01)
*B23K 35/26* (2006.01)
*B23K 35/36* (2006.01)

(52) U.S. Cl.
CPC .......... *B23K 35/362* (2013.01); *B23K 35/025* (2013.01); *B23K 35/262* (2013.01); *B23K 35/3613* (2013.01); *B23K 35/3618* (2013.01)

(58) Field of Classification Search
None
See application file for complete search history.

(56) References Cited

U.S. PATENT DOCUMENTS

| 4,954,184 A | * | 9/1990 | Conn ..................... B23K 35/36 148/26 |
| 2016/0271738 A1 | * | 9/2016 | Murphy ............... B23K 35/262 |
| 2020/0269362 A1 | * | 8/2020 | Uchida ................ B23K 35/362 |

FOREIGN PATENT DOCUMENTS

| CN | 109429491 | 3/2019 | |
| EP | 0 251 611 A2 | 1/1988 | |
| JP | 2002-224881 | 8/2002 | |
| JP | 2006-181637 | 7/2006 | |
| JP | 2010-167465 | 8/2010 | |
| JP | 2014-117737 | 6/2014 | |
| JP | 2015-098052 | 5/2015 | |
| JP | 2019-013926 | 1/2019 | |
| TW | 201210733 | 3/2021 | |
| WO | WO-2016199747 A1 * | 12/2016 | ........... B23K 35/262 |
| WO | WO-2019-009097 A1 | 1/2019 | |
| WO | WO-2019-142826 A1 | 7/2019 | |

OTHER PUBLICATIONS

Machine translation of WO 2016/199747A1. (Year: 2016).*
Machine translation of JP 2015-098052A. (Year: 2015).*
Taiwanese Search Report (Application No. 109110561) mailed Jun. 1, 2023 (1 page).
Taiwanese Office Action (Application No. 109110561) mailed Jun. 1, 2023 (19 pages).
Chinese Office Action (Application No. 202080014070.6) mailed Dec. 17, 2021 (27 pages).
International Search Report for PCT/JP2020/013920, mailed Jun. 23, 2020.
Notice of Reasons for Rejection for JP-2019-068338, mailed Dec. 10, 2019.

* cited by examiner

*Primary Examiner* — Xiaowei Su
(74) *Attorney, Agent, or Firm* — NIXON PEABODY LLP; Jeffrey L. Costellia

(57) ABSTRACT

A solder paste contains a flux and a metal powder, wherein the flux contains: 0.5% by mass to 20.0% by mass of a (carboxyalkyl)isocyanurate adduct; 5.0% by mass to 45.0% by mass of a rosin; and a solvent. The (carboxyalkyl) isocyanurate adduct is at least one selected from the group consisting of mono(carboxyalkyl)isocyanurate adducts, bis (carboxyalkyl)isocyanurate adducts and tris(carboxyalkyl) isocyanurate adducts.

8 Claims, No Drawings

SOLDER PASTE

CROSS-REFERENCE TO RELATED APPLICATION

This application is a continuation application based on PCT Patent Application No. PCT/JP2020/013920, filed on Mar. 27, 2020, which claims the benefit of priority of the prior Japanese Patent Application No. 2019-068338 filed on Mar. 29, 2019, the content of which is incorporated herein by reference.

TECHNICAL FIELD

The present invention relates to a solder paste using a flux to be used to conduct soldering.

BACKGROUND

A flux to be used to conduct soldering generally has an ability to chemically remove metal oxides present on a soldering and a metal surface of an object to be soldered, thereby allowing the movement of metal elements at the boundaries of both. Therefore, soldering using a flux allows intermetallic compounds to be formed between the solder and the metal surface of the object to be soldered, thereby forming a strong junction.

A solder paste is a composite material obtained by mixing a solder alloy powder with a flux. In a case where soldering is conducted using a solder paste, the solder paste is printed on a solder part such as an electrode of a substrate, a part is mounted on the solder part, and the solder is melted by heating the substrate in a heating furnace called a reflow furnace to conduct soldering.

Patent Document 1 (Japanese Unexamined Patent Application Publication No. 2014-117737) discloses a flux and a solder paste made to be suitable for a part having a relatively large bonding area, such as a heat sink component, by combining a hydroiodic acid salt of an organic amine with a 6-membered aromatic or alicyclic monocarboxylic acid, a 6-membered aromatic or alicyclic dicarboxylic acid, or an imidazole compound or a carboxylic acid salt thereof.

SUMMARY

Problems to be Solved by the Invention

A finish after mounting, such as the wet spreadability, may differ completely depending on the heat history during soldering. Therefore, a flux that can be soldered with a stable finish is required regardless of the heat history.

The present invention has been made to solve such problems and is intended to provide a solder paste using a flux having excellent solder spreadability.

Means to Solve the Problems

It has been found that the solder wettability to a joint part is improved by formulating a (carboxyalkyl)isocyanurate adduct in a flux.

The present disclosure is directed to a solder paste containing a flux and a metal powder, wherein
the flux contains a (carboxyalkyl)isocyanurate adduct, and
the metal powder consists of a solder alloy having an alloy constitution composed of: 25 ppm by mass to 300 ppm by mass of As; and at least one selected from the group consisting of more than 0 ppm by mass and no more than 3000 ppm by mass of Sb, more than 0 ppm by mass and no more than 10000 ppm by mass of Bi, and more than 0 ppm by mass and no more than 5100 ppm by mass of Pb Pb; and a balance of Sn, and satisfying the following formulae (1) and (2).

$$275 \leq 2As + Sb + Bi + Pb \quad (1)$$

$$0.01 \leq (2As + Sb)/(Bi + Pb) \leq 10.00 \quad (2)$$

In the formulae (1) and (2), As, Sb, Bi, and Pb each independently represents an amount (ppm by mass) thereof in the alloy constitution.

It is preferable that the flux further contain a resin, and the resin be a rosin. It is preferable that the flux according to the present invention contain 0.5% by mass to 20.0% by mass of the (carboxyalkyl)isocyanurate adduct, relative to the total mass of the flux.

It is preferable that the (carboxyalkyl)isocyanurate adduct in the flux be one selected from the group consisting of mono(carboxyalkyl)isocyanurate adducts, bis(carboxyalkyl)isocyanurate adducts and tris(carboxyalkyl)isocyanurate adducts, or a combination of at least two thereof, and the tris(carboxyalkyl)isocyanurate adduct be a tris(2-carboxyethyl)isocyanurate, a tris(1-carboxymethyl)isocyanurate, or a tris(3-carboxypropyl)isocyanurate, and the bis(carboxyalkyl)isocyanurate adduct be a bis(2-carboxyethyl)isocyanurate.

Alternatively, the present disclosure is directed to a solder paste containing a flux and a metal powder, wherein
the flux contains, relative to the total mass of the flux, 0.5% by mass to 20.0% by mass of a (carboxyalkyl)isocyanurate adduct, 5.0% by mass to 50.0% by mass of a rosin, and a solvent, and
the metal powder consists of a solder alloy having an alloy constitution composed of: 25 ppm by mass to 300 ppm by mass of As; at least one selected from the group consisting of more than 0 ppm by mass and no more than 3000 ppm by mass of Sb, more than 0 ppm by mass and no more than 10000 ppm by mass of Bi, and more than 0 ppm by mass and no more than 5100 ppm by mass of Pb; and a balance of Sn, and satisfying the following formulae (1) and (2).

$$275 \leq 2As + Sb + Bi + Pb \quad (1)$$

$$0.01 \leq (2As + Sb)/(Bi + Pb) \leq 10.00 \quad (2)$$

In the formulae (1) and (2), As, Sb, Bi, and Pb each independently represents an amount (ppm by mass) thereof in the alloy constitution.

It is preferable that the flux further contain 0% by mass to 30.0% by mass of an additional resin different from the rosin, relative to the total mass of the flux, the additional resin different from the rosin be an acrylic resin, and, in the case where the amount of the acrylic resin exceeds 0% by mass, the ratio (mass ratio) of the total amount of the acrylic resin relative to the total amount of the rosin be 0.1 to 9.0. In addition, it is preferable that the flux contain, relative to the total mass of the flux, 0% by mass to 10.0% by mass of an additional organic acid different from the (carboxyalkyl)isocyanurate adduct, 0% by mass to 5.0% by mass of an amine, 0% by mass to 5.0% by mass of an organic halogen compound, 0% by mass to 5.0% by mass of an amine halogenated hydroacid salt, and 0% by mass to 10.0% by mass of a thixo agent.

The alloy constitution may further satisfy the following formula (1a).

$$275 \leq 2As + Sb + Bi + Pb \leq 25200 \quad (1a)$$

In the formula (1a), As, Sb, Bi, and Pb each represents an amount (ppm by mass) thereof in the alloy constitution.

The alloy constitution may further satisfy the following formula (1b).

$$275 \leq 2As + Sb + Bi + Pb \leq 5300 \quad (1b)$$

In the formula (1b), As, Bi, and Pb each represents an amount (ppm by mass) thereof in the alloy constitution.

The alloy constitution may further satisfy the following formula (2a).

$$0.31 \leq (2As + Sb)/(Bi + Pb) \leq 10.00 \quad (2a)$$

In the formula (2a), As, Sb, Bi, and Pb each represents an amount (ppm by mass) thereof in the alloy constitution.

The alloy constitution may further contain at least one selected from the group consisting of 0% by mass to 4% by mass of Ag and 0% by mass to 0.9% by mass of Cu.

EMBODIMENTS FOR CARRYING OUT THE INVENTION

A solder paste according to the present embodiment contains a flux and a metal powder.

The flux contains a (carboxyalkyl)isocyanurate adduct. The flux according to the present embodiment may further contain a resin and/or a solvent.

The (carboxyalkyl)isocyanurate adduct is a 6-membered heterocyclic compound that has a heat resistance in the temperature range in which soldering is assumed to be conducted and functions as an active agent during soldering compared to organic acids such as straight-chain carboxylic acids and branched carboxylic acids.

The flux and a core of a solder ball or a metal are coated with a solder to obtain a core ball, and soldering is performed in a reflow furnace using the core ball, thereby removing oxidized materials that cause poor wetting of solder, and improving the solder spreadability. In addition, soldering in a reflow furnace using a solder paste containing the flux and a metal powder improves the solder spreadability.

Examples of the (carboxyalkyl)isocyanurate adduct include mono(carboxyalkyl)isocyanurate adducts, bis(carboxyalkyl)isocyanurate adducts, and tris(carboxyalkyl)isocyanurate adducts.

Examples of the tris(carboxyalkyl)isocyanurate adducts include tris(2-carboxyethyl)isocyanurate, tris(1-carboxymethyl)isocyanurate, and tris(3-carboxypropyl)isocyanurate. Examples of the bis(carboxyalkyl)isocyanurate adducts include bis(2-carboxyethyl)isocyanurate.

The tris(2-carboxyethyl)isocyanurate is represented by the following formula (1). The CAS registry number of tris(2-carboxyethyl)isocyanurate is 2904-41-8. The tris(1-carboxymethyl)isocyanurate is represented by the following formula (2). The CAS registry number of tris(1-carboxymethyl)isocyanurate is 1968-52-1. The tris(3-carboxypropyl)isocyanurate is represented by the following formula (3). The CAS registry number of tris(3-carboxypropyl)isocyanurate is 319017-31-7. The bis(2-carboxyethyl)isocyanurate is represented by the following formula (4). The CAS registry number of bis(2-carboxyethyl)isocyanurate is 2904-40-7.

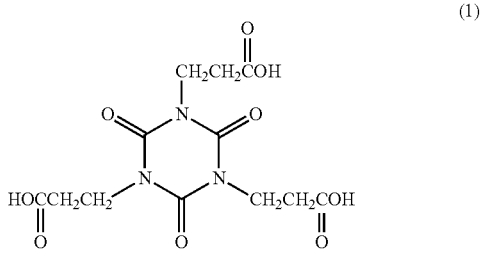

(1)

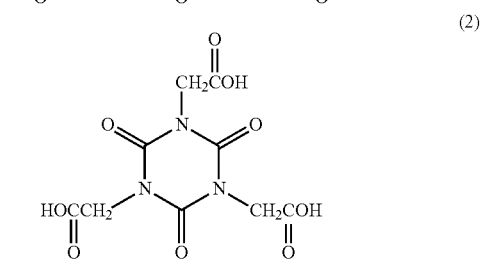

(2)

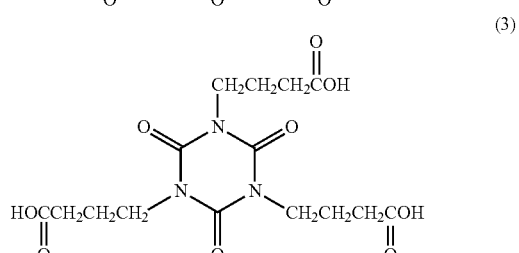

(3)

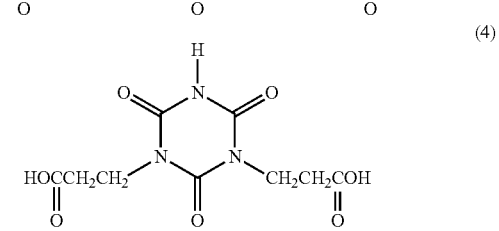

(4)

The (carboxyalkyl)isocyanurate adduct is an essential component of the flux to improve the solder spreadability, and at least one thereof may be used. The amount of the (carboxyalkyl)isocyanurate adduct relative to the total mass of the flux is preferably 0.5% by mass to 20.0% by mass.

The flux includes a rosin as a resin. Examples of the rosins include: raw material rosins, such as gum rosins, wood rosins and tall oil rosins; and derivatives obtained from the raw material rosins. Examples of the derivatives include: purified rosin; hydrogenated rosin; heterogeneous rosin; polymerized rosin; acid-modified rosin; phenol-modified rosin; and α, β unsaturated carboxylic acid-modified products (such as acrylated rosin, maleated rosin, and fumarated rosin); purified products, hydrogenated products and heterogeneous products of the polymerized rosins; and purified products, hydrogenated products and heterogeneous products of the α, β unsaturated carboxylic acid-modified products.

The rosin is an essential component of the flux to improve the solder spreadability and at least one thereof may be used. The amount of the rosin relative to the total mass of the flux is preferably 5.0% by mass to 50.0% by mass.

The flux may further contain an acrylic resin as an additional resin different from the rosin. Examples of the acrylic resin include polymers of acrylic acids, polymers of acrylate esters, and polymers of acrylic acids and acrylate esters, formed by using monomers such as acrylic acids, acrylate esters which are reactants of acrylic acids and alcohols, methacrylic acids, and methacrylate esters which are reactants of methacrylic acids and alcohols. Additional examples thereof include polymers of methacrylic acids, polymers of methacrylate esters, and polymers of methacrylic acids and methacrylate esters. Additional examples thereof include polymers of acrylic acids and methacrylic acids, polymers of acrylic acids and methacrylate esters, polymers of methacrylic acids and acrylate esters, polymers of acrylate esters and methacrylate esters, polymers of acrylic acids, methacrylic acids, and acrylate esters, polymers of acrylic acids, methacrylic acids, and methacrylate esters, polymers of acrylic acids, methacrylic acids, acrylate esters, and methacrylate esters, polymers of acrylic acids, acrylate esters, and methacrylate esters, and polymers of methacrylic acids, acrylate esters, and methacrylate esters. Examples of acrylate esters include butyl acrylate, and examples of acrylic resins using butyl acrylate as a monomer include polymers of butyl acrylate, polymers of butyl acrylate and an acrylate ester other than butyl acrylate, polymers of acrylic acid and butyl acrylate, and polymers of acrylic acid, butyl acrylate, and an acrylate ester other than butyl acrylate. In addition, examples of methacrylate esters include butyl methacrylate, and examples of acrylic resins using butyl methacrylate as a monomer include polymers of butyl methacrylate, polymers of butyl methacrylate and methacrylate esters other than butyl methacrylate, polymers of methacrylic acid and butyl methacrylate, and polymers of methacrylic acid, butyl methacrylate, and a methacrylate ester other than butyl methacrylate. Additional examples thereof include polymers of acrylic acid and butyl methacrylate, polymers of acrylic acid, butyl methacrylate, and a methacrylate ester other than butyl methacrylate, polymers of methacrylic acid and butyl acrylate, polymers of methacrylic acid, butyl acrylate, and an acrylate ester other than butyl acrylate, polymers of butyl acrylate and butyl methacrylate, polymers of butyl methacrylate and an acrylate ester other than butyl acrylate, and polymers of butyl acrylate and a methacrylate ester other than butyl methacrylate. A polymerization reaction to obtain a polymer may be random copolymerization or block copolymerization. In addition, the above-described alcohol may be a C1-24 alcohol having a linear carbon chain or a C3-24 alcohol having a branched carbon chain. Examples of the above-described alcohol include methanol having 1 carbon atom, ethanol having 2 carbon atoms, 1-propanol having 3 carbon atoms, 2-propanol having 3 carbon atoms, ethylene glycol monomethyl ether having 3 carbon atoms, 1-butanol having 4 carbon atoms, 2-butanol having 4 carbon atoms, isobutanol having 4 carbon atoms, 1-hexanol having 6 carbon atoms, diethylene glycol monoethyl ether having 6 carbon atoms, benzyl alcohol having 7 carbon atoms, 1-octanol having 8 carbon atoms, 2-ethylhexanol having 8 carbon atoms, phenyl glycol having 8 carbon atoms, 1-decanol having 9 carbon atoms, lauryl alcohol having 12 carbon atoms, cetyl alcohol having 16 carbon atoms, stearyl alcohol having 18 carbon atoms, oleyl alcohol having 18 carbon atoms, and behenyl alcohol having 22 carbon atoms.

The molecular weight of the acrylic resin is preferably 5000 to 30000, and more preferably 6000 to 15000, as a weight-average molecular weight (Mw) based on polystyrene standards measured by gel permeation chromatography (GPC).

Examples of such an acrylic resin include poly 2-ethylhexylacrylate (Mw=8300) and polylauryl methacrylate (Mw=10080).

The flux may further contain an additional resin different from both the rosin and the acrylic resin. Examples of the additional resin different from both the rosin and the acrylic resin include a terpene resin, a modified terpene resin, a terpene phenol resin, a modified terpene phenol resin, a styrene resin, a modified styrene resin, a xylene resin, a modified xylene resin, polyethylene, polypropylene, polyvinyl acetate, polyvinyl alcohol, a polyethylene polypropylene copolymer, and a polyethylene polyvinyl acetate copolymer. Examples of the modified terpene resin include an aromatic modified terpene resin, a hydrogenated terpene resin, and a hydrogenated aromatic modified terpene resin. Examples of the modified terpene phenol resin include a hydrogenated terpene phenol resin. Examples of the modified styrene resin include a styrene-acrylic resin, and a styrene-maleic acid resin. Examples of the modified xylene resin include a phenol-modified xylene resin, an alkylphenol-modified xylene resin, a phenol-modified resol-type xylene resin, a polyol-modified xylene resin, and a polyoxyethylene-added xylene resin. The additional resin different from both the rosin and the acrylic resin may be a copolymer of the above-mentioned acrylic resin and another resin, and examples thereof include a copolymer of the above-mentioned acrylic resin and a polyethylene. Examples of such an acrylic polyethylene copolymer resin include poyly 2-ethylhexyl acrylate polyethylene (Mw=12300).

The additional resin is an optional additive ingredient of the flux to improve the solder spreadability, and at least one thereof may be used. The amount of the additional resin relative to the total mass of the flux is preferably 0% by mass to 30.0% by mass, and more preferably 5.0% by mass to 30.0% by mass. In the case where the additional resin is contained, the ratio (mass ratio) of the total amount of the additional resin to the total amount of the rosin is preferably 0.1 to 9.0. In the case where an acrylic resin is contained as an additional resin, the amount of the acrylic resin relative to the total mass of the flux is preferably 0% by mass to 30.0% by mass, and more preferably 5.0% by mass to 30.0% by mass. In the case where an acrylic resin is contained as an additional resin, the ratio (mass ratio) of the total amount of the acrylic resin to the total amount of the rosin is preferably 0.1 to 9.0, and more preferably 0.1 to 6.0.

The flux may further contain an additional activator in addition to the (carboxyalkyl)isocyanurate adduct. The presence of the additional activator enhances the effects of removing an oxidized material.

Examples of the additional activator include additional organic acids different from the (carboxyalkyl)isocyanurate adduct, amines, organic halogen compounds, and amine halogenated hydroacid salts.

Examples of the additional organic acid different from the (carboxyalkyl)isocyanurate adducts include glutaric acid, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, phthalic acid, isophthalic acid, terephthalic acid, dodecanedioic acid, para-hydroxyphenylacetic acid, picolinic acid, phenylsuccinic acid, fumaric acid, maleic acid, malonic acid, lauric acid, benzoic acid, tartaric acid, glycine, 1,3-cyclohexanedicarboxylic acid, 2,2-bis(hydroxymethyl)propionic acid, 2,2-bis(hydroxymethyl)butanoic acid, 4-tert-butylbenzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid, and linolenic acid.

Examples of the additional organic acid different from the (carboxyalkyl)isocyanurate adduct include dimer acids which are reactant dimers of monocarboxylic acids, hydrogenated dimer acids obtained by adding hydrogen to dimer acids, trimer acids which are reactant trimers of monocarboxylic acids, and hydrogenated trimer acids obtained by adding hydrogen to trimer acids.

Examples of the dimer acids include a dimer obtained using an oleic acid and a linoleic acid as monomers. The carbon number of the dimer acid obtained using an oleic acid and a linoleic acid as monomers is 36. Examples of the trimer acids include a trimer obtained using an oleic acid and a linoleic acid as monomers. The carbon number of the trimer acid obtained using an oleic acid and a linoleic acid as monomers is 54.

Examples of the dimer acids, the trimer acids, the hydrogenated dimer acids and the hydrogenated trimer acids include the above-mentioned dimer acid which is a reactant of an oleic acid and a linoleic acid, the trimer acid which is a reactant of an oleic acid and a linoleic acid, the hydrogenated dimer acid obtained by adding a hydrogen to the dimer acid which is a reactant of an oleic acid and a linoleic acid, and the hydrogenated trimer acid obtained by adding a hydrogen to the trimer acid which is a reactant of an oleic acid and a linoleic acid.

Additional examples of the dimer acids, trimer acids, hydrogenated dimer acids and hydrogenated trimer acids include a dimer acid which is a reactant of an acrylic acid, a trimer acid which is a reactant of an acrylic acid, a dimer acid which is a reactant of a methacrylic acid, a trimer acid which is a reactant of a methacrylic acid, a dimer acid which is a reactant of an acrylic acid and a methacrylic acid, a trimer acid which is a reactant of an acrylic acid and a methacrylic acid, a dimer acid which is a reactant of an oleic acid, a trimer acid which is a reactant of an oleic acid, a dimer acid which is a reactant of a linoleic acid, a trimer acid which is a reactant of a linoleic acid, a dimer acid which is a reactant of a linolenic acid, a trimer acid which is a reactant of a linolenic acid, a dimer acid which is a reactant of an acrylic acid and an oleic acid, a trimer acid which is a reactant of an acrylic acid and an oleic acid, a dimer acid which is a reactant of an acrylic acid and a linoleic acid, a trimer acid which is a reactant of an acrylic acid and a linoleic acid, a dimer acid which is a reactant of an acrylic acid a linolenic acid, a trimer acid which is a reactant of an acrylic acid and a linolenic acid, a dimer acid which is a reactant of a methacrylic acid and an oleic acid, a trimer acid which is a reactant of a methacrylic acid and an oleic acid, a dimer acid which is a reactant of a methacrylic acid and a linoleic acid, a trimer acid which is a reactant of a methacrylic acid and a linoleic acid, a dimer acid which is a reactant of a methacrylic acid and a linolenic acid, a trimer acid which is a reactant of a methacrylic acid and a linolenic acid, a dimer acid which is a reactant of an oleic acid and a linolenic acid, a trimer acid which is a reactant of an oleic acid and a linolenic acid, a dimer acid which is a reactant of a linoleic acid and a linolenic acid, a trimer acid which is a reactant of a linoleic acid and a linolenic acid, hydrogenated dimer acids obtained by adding hydrogens to the dimer acids different from the above-mentioned reactant of an oleic acid and a linoleic acid, and hydrogenated trimer acids obtained by adding hydrogens to the trimer acids different from the above-mentioned reactant of an oleic acid and a linoleic acid.

The additional organic acid different from the (carboxyalkyl)isocyanurate adduct is an optional additive ingredient in the flux to improve the solder spreadability, and at least one thereof may be used. The amount of the additional organic acid different from the (carboxyalkyl)isocyanurate adduct relative to the total mass of the flux is preferably 0% by mass to 10.0% by mass.

Examples of amines include monoethanolamine, diphenylguanidine, ethylamine, triethylamine, ethylenediamine, triethylenetetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine-isocyanuric acid adducts, 2-phenylimidazole-isocyanuric acid adducts, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine-isocyanuric acid adducts, 2,4-diamino-6-methacryloyloxyethyl-s-triazine, epoxy-imidazole adducts, 2-methylbenzimidazole, 2-octylbenzimidazole, 2-pentylbenzimidazole, 2-(1-ethylpentyl)-benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl] benzotriazole, carboxybenzotriazole, 1-[N,N-bis(2-ethylhexyl) aminomethyl] methylbenzotriazole, 2,2'-[[(methyl-1H-benzotriazol-1-yl) methyl] imino]bisethanol, 1-(1',2'-dicarboxyethyl)benzotriazole, 1-(2,3-dicarboxypropyl)benzotriazole, 1-[(2-ethylhexyl amino)methyl]benzotriazole, 2,6-bis[(1H-benzimidazol-1-yl) methyl]-4-methylphenol, 5-methylbenzotriazole, 5-phenyltetrazole, a polyethylene glycol-polypropylene glycol copolymer having amino groups at both end groups (diamine-terminated PEG-PPG copolymer), dimethylamine, 1-aminopropane, isopropylamine, trimethylamine, allylamine, n-butylamine, diethylamine, sec-butylamine, tert-butylamine, N,N-dimethylethylamine, isobutylamine, cyclohexylamine, aniline, N-methylaniline, diphenylamine, N-isopropylaniline, p-isopropylaniline, 2-aminoethanol, 2-(ethylamino)ethanol, diethanolamine, diisopropanolamine, triethanolamine, N-butyldiethanolamine, triisopropanolamine, N,N-bis(2-hydroxyethyl)-N-cyclohexylamine, N,N,N',N'-tetrakis(2-hydroxypropyl)ethylenediamine, N,N,N',N'',N''-pentakis(2-hydroxypropyl)diethylenetriamine, alanine, arginine, asparagine, aspartic acid, cysteine hydrochloride, glutamine, glutamic acid, glycine, histidine, isoleucine, leucine, lysine monohydrochloride, methionine, phenylalanine, proline, serine, threonine, tryptophan, tyrosine, valine, β-alanine, γ-aminobutyric acid, δ-aminovaleric acid, ε-aminohexanoic acid, ε-caprolactam, γ-aminoheptanoic acid, dicyandiamide, 1,3-diphenylguanidine, 1,3-di-o-tolylguanidine, and tetrakis (2-hydroxydipropyl)ethylenediamine.

The amine is an optional additive ingredient of the flux to improve the solder spreadability, and at least one thereof may be used. The amount of the amine relative to the total mass of the flux is preferably 0% by mass to 10.0% by mass.

Examples of the organic halogen compounds include organic bromo compounds such as trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, 1,1,2,2-tetrabromoethane, 2,2,2-tribromoethanol, pentabromoethane, carbon tetrabromide, 2,2-bis(bromomethyl)-1,3-propanediol, meso-2,3-acid, n-hexadecyltrimethylammonium bromide, 2,2-bis[3,5-dibromo-4-(2,3-dibromopropoxy)phenyl]propane, bis[3,5-dibromo-4-(2,3-dibromopropoxy)phenyl] sulfone, ethylenebispentabromobenzene, brominated bisphenol A type epoxy resin, tetrabromophthalic acid, and bromosuccinic acid. Additional examples thereof include organic chloro compounds such as 2,3-dichloro-1-propanol, 2-chloromethyloxirane, chloroalkanes, chlorinated fatty acid esters, HET acid, and HET anhydride. Additional examples thereof include organic fluoro compounds such as fluorine-based surfactants, surfactants having perfluoroalkyl groups, and polytetrafluoroethylene.

The organic halogen compound is an optional additive ingredient in the flux to improve the solder spreadability, and at least one thereof may be used. The amount of the organic halogen compound relative to the total mass of the flux is preferably 0% by mass to 5.0% by mass.

The amine halogenated hydroacid salt is a compound formed by reacting an amine and a hydrogen halide, and examples thereof include aniline hydrogen chloride and aniline hydrogen bromide. The above-described amine may be used as the amine to obtain the amine halogenated hydroacid salts, and examples thereof include ethylamine, ethylenediamine, triethylamine, methylimidazole, and 2-ethyl-4-methylimidazole, and examples of the hydrogen halide include hydrides of chlorine, bromine, iodine, and fluorine (hydrogen chloride, hydrogen bromide, hydrogen iodide, and hydrogen fluoride). Examples of such an amine halogenated hydroacid salt include stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosin amine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrobromide, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, monoethylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosin amine hydrobromide, 2-phenylimidazole hydrobromide, 4-benzylpyridine hydrobromide, L-glutamate hydrochloride, N-methylmorpholine hydrochloride, betaine hydrochloride, 2-pipecolin hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluoride, cyclohexylamine tetrafluoroborate, and dicyclohexylamine tetrafluoroborate. A fluoroboride may be contained instead of the amine halogenated hydroacid salt, or together with the amine halogenated hydroacid salt, and examples of the fluoroboride include fluoroboric acid.

The amine halogenated hydroacid salt is an optional additive ingredient in the flux to improve the solder spreadability, and at least one thereof may be used. The amount of the amine halogenated hydroacid salt relative to the total mass of the flux is preferably 0% by mass to 5.0% by mass.

The flux may further contain a thixo agent, or a metal deactivator.

Examples of the thixo agent include ester-based thixo agents, and amide-based thixo agents. Examples of the ester-based thixo agents include hardened castor oil. Examples of the amide-based thixo agents include lauramide, palmitamide, stearamide, behenamide, hydroxystearamide, saturated fatty acid amide, oleamide, erucamide, unsaturated fatty acid amide, p-toluene methane amide, aromatic amide, methylenebisstearamide, ethylenebislauramide, ethylenebishydroxystearamide, saturated fatty acid bisamide, methylenebisoleamide, unsaturated fatty acid bisamide, m-xylylenebisstearamide, aromatic bisamide, saturated fatty acid polyamide, unsaturated fatty acid polyamide, aromatic polyamide, substituted amide, methylolstearamide, methylolamide, and fatty acid ester amide.

The thixo agent is an optional additive ingredient of the flux to improve the solder spreadability, and at least one thereof may be used. The amount of the thixo agent relative to the total mass of the flux is preferably 0% by mass to 10.0% by mass.

Examples of the metal deactivator include hindered phenol-based metal deactivators and nitrogen compound-based metal deactivators. Examples of the hindered phenol-based metal deactivators include bis(3-(3-tert-butyl-4-hydroxy-5-methylphenyl)propionic acid), and N,N'-hexamethylenebis (3-(3,5-di-tert-butyl-4-hydroxyphenyl) propanamide). Examples of the nitrogen compound-based metal deactivators include N-(2H-1,2,4-triazol-5-yl) salicylamide.

The metal deactivator is an optional additive ingredient of the flux to improve the solder spreadability, and at least one thereof may be used.

Examples of the solvent include water, ester-based solvents, alcohol-based solvents, glycol ether-based solvents, and terpineols. Examples of the ester-based solvent include alkyl fatty acids, butyl stearate, 2-ethylhexyl stearate, isotridecyl stearate, methyl oleate, isobutyl oleate, coconut fatty acid methyl esters, methyl laurate, isopropyl myristate, isopropyl palmitate, 2-ethylhexyl palmitate, and octyldodecyl myristate. Examples of the alcohol-based solvent include ethanol, industrial ethanol (mixed solvent obtained by adding methanol and/or isopropyl alcohol to ethanol), isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis[2,2,2-tris(hydroxymethyl)ethyl]ether, 1-ethynyl-1-cyclohexanol, 1,4-cyclohexanediol, 1,4-cyclohexane dimethanol, erythritol, threitol, guaiacol glycerol ether, 3,6-dimethyl-4-octyne-3,6-diol, and 2,4,7,9-tetramethyl-5-decyne-4,7-diol. Examples of the glycol ether-based solvents include hexyl diglycol, diethylene glycol mono-2-ethylhexyl ether, ethylene glycol monophenyl ether, 2-methylpentane-2,4-diol, diethylene glycol monohexyl ether, diethylene glycol dibutyl ether, triethylene glycol monobutyl ether, 1,3-butylene glycol, phenyl glycol, and hexylene glycol.

The solvent is an essential component of the flux to improve the solder spreadability, and at least one thereof may be used. In the case where the (carboxyalkyl)isocyanurate adduct, the resin, and the solvent are only contained as essential components in the above-mentioned amount, the amount of the solvent is the balance of the amount of the essential components.

In the case where the flux further contains at least one selected from the group consisting of the organic acids, the amines, the organic halogen compounds, the amine halogenated hydroacid salts, and the thixo agents in the above-mentioned amount, the amount of the solvent is a balance of the amount of the essential components and the optional additive ingredients.

The flux may contain a nonionic surfactant. The nonionic surfactant serves as a water-soluble resin, and the presence of the nonionic surfactant instead of the above-mentioned resin in the flux improves aqueous cleaning properties of the flux. Examples of the nonionic surfactant include polyalkylene glycol, alcohol polyalkylene glycol adducts, and carboxylic polyalkylene glycol adducts.

Examples of the polyalkylene glycol include polyethylene glycol (PEG), and polyethylene glycol-polypropylene glycol copolymer (PEG-PPG copolymer).

Examples of the alcohol polyalkylene glycol adducts include: alcohol polyalkylene glycol EO adducts in which ethylene oxide is additionally polymerized with alcohol polyalkylene glycol; and alcohol polyalkylene glycol EO/PO adducts in which ethylene oxide and polypropylene oxide are additionally polymerized with alcohol polyalkylene glycol. Examples of such alcohol polyalkylene glycol adducts include C16 cetyl alcohol EO adducts, cetyl alcohol EO/PO adducts, C18 stearyl alcohol EO adducts, stearyl alcohol EO/PO adducts, C22 behenyl alcohol EO adducts, and behenyl alcohol EO/PO adducts, C6 resorcinol EO adducts, and resorcinol EO/PO adducts.

Examples of the polyalkylene glycol carboxylate adducts include polyalkylene glycol carboxylate EO adducts, and polyalkylene glycol carboxylate EO/PO adducts. Examples of such polyalkylene glycol carboxylate adducts include C16 palmitate EO adducts, palmitate EO/PO adducts, C18 stearate EO adducts, stearate EO/PO adducts, C22 behenate EO adducts, and behenate EO/PO adducts.

In the case where the flux is a water-soluble flux, the flux preferably contains the nonionic surfactant in an amount of 5.0% by mass to 20.0% by mass, and more preferably 10.0% by mass to 20.0% by mass, relative to the total mass of the flux, instead of the resin. The flux may further contain 5.0% by mass or less of a rosin.

In the case where the flux is a water-soluble flux, the flux preferably contains an organic acid in an amount of 1.0% by mass to 10.0% by mass, relative to the total mass of the flux, and at least one selected from the group consisting of diglycolic acid, glutaric acid, and 2,2-bis(hydroxymethyl)propionic acid is preferably contained as the organic acid. In addition, the water-soluble flux preferably contains an amine in an amount of 30.0% by mass to 55.0% by mass, relative to the total mass of the flux, and at least one selected from the group consisting of diamine-terminated PEG-PPG copolymer, tetrakis(2-hydroxydipropyl)ethylenediamine, and 2-methylimidazole is preferably contained as the amine. In addition, the water-soluble flux preferably contains an amine halogenated hydroacid salt in an amount of 0% by mass to 5.0% by mass, relative to the total mass of the flux, and an ethylamine HBr is preferably contained as the amine halogenated hydroacid salt. In addition, the water-soluble flux preferably contains at least one solvent selected from the group consisting of 1,3-butylene glycol, phenyl glycol, and hexylene glycol, as the balance thereof.

The solder paste according to the present embodiment contains the flux and a metal powder. The metal powder is composed of solder consisting of Sn, Sn—Ag-based alloy, Sn—Cu-based alloy, Sn—Ag—Cu-based alloy, Sn—Bi-based alloy, Sn—In-based alloy, or solder alloy in which Sb, Bi, In, Cu, Zn, As, Ag, Cd, Fe, Ni, Co, Au, Ge, P, or Pb is added to the alloy.

In the present specification, the amount of As, Sb, Bi, or Pb means the amount thereof relative to the total mass of the solder alloy.

It is preferable that the solder alloy have an alloy constitution composed of: 25 ppm by mass to 300 ppm by mass of As; at least one selected from the group consisting of more than 0 ppm by mass and no more than 3000 ppm by mass of Sb, more than 0 ppm by mass and no more than 10000 ppm by mass of Bi, and more than 0 ppm by mass and no more than 5100 ppm by mass of Pb; and a balance of Sn. The solder alloy may further contain at least one selected from the group consisting of 0% by mass to 4% by mass of Ag, and 0% by mass to 0.9% by mass of Cu.

As is an element that suppresses a change in the viscosity of the solder paste over time. As has a low reactivity against the flux, and is a noble element relative to Sn, and therefore As is assumed to exhibit a viscosity-increase suppression effect. The amount of As is, for example, 25 ppm by mass or more, preferably 50 ppm by mass or more, and even more preferably 100 ppm by mass or more. In contrast, the presence of an excessively large amount of As causes deterioration of the wettability of the solder alloy. The amount of As is, for example, 300 ppm by mass or less, preferably 250 ppm by mass or less, and more preferably 200 ppm by mass or less.

Sb is an element having low reactivity against the flux and exhibiting viscosity-increase suppression effects. In the case where the solder alloy contains Sb, the amount of Sb is, for example, more than 0 ppm by mass, preferably 25 ppm by mass or more, more preferably 50 ppm by mass or more, even more preferably 100 ppm by mass or more, and particularly preferably 300 ppm by mass or more. In contrast, the presence of an excessively large amount of Sb causes deterioration of the wettability, and therefore the amount thereof is required to be adjusted to an appropriate amount. The amount of Sb is, for example, 3000 ppm by mass or less, preferably 1150 ppm by mass or less, and more preferably 500 ppm by mass or less.

Bi and Pb are elements having low reactivity against the flux and exhibiting viscosity-increase suppression effects, in a similar manner to Sb. Bi and Pb decrease both the liquidus-line temperature of the solder alloy and the viscosity of the molten solder, thereby suppressing the deterioration of the wettability caused by As.

The presence of at least one element selected from the group consisting of Sb, Bi and Pb suppresses the deterioration of the wettability caused by As. In the case where the solder alloy contains Bi, the amount of Bi is, for example, more than 0 ppm by mass, preferably 25 ppm by mass or more, more preferably 50 ppm by mass or more, even more preferably 75 ppm by mass or more, particularly preferably 100 ppm by mass or more, and most preferably 250 ppm by mass or more. In the case where the solder alloy contains Pb, the amount of Pb is, for example, more than 0 ppm by mass, preferably 25 ppm by mass or more, more preferably 50 ppm by mass or more, even more preferably 75 ppm by mass or more, particularly preferably 100 ppm by mass or more, and most preferably 250 ppm by mass or more.

In contrast, the presence of an excessively large amount of Bi or Pb causes a significant decrease in the solidus temperature, thereby excessively increasing the thermal difference ΔT between the liquidus-line temperature and the solidus temperature. In the case where the thermal difference ΔT is excessively large, a high melting-point crystalline phase in which the amounts of Bi and Pb are low precipitates during the solidification process of the molten solder, thereby concentrating Bi and Pb in the liquid phase. Subsequently, when the temperature of the molten solder further decreases, a low melting-point crystalline phase in which the amounts of Bi and Pb are high becomes segregated. Therefore, the mechanical strength of the solder alloy is deteriorated and the reliability is deteriorated. In particular, since the crystalline phase in which the concentration of Bi is high is hard and fragile, the reliability is significantly deteriorated when the crystalline phase is segregated in the solder alloy.

From such a viewpoint, in the case where the solder alloy contains Bi, the amount of Bi is, for example, 10000 ppm by mass or less, preferably 1000 ppm by mass or less, more preferably 600 ppm by mass or less, and even more preferably 500 ppm by mass or less. In the case where the solder alloy contains Pb, the amount of Pb is, for example, 5100 ppm by mass or less, preferably 5000 ppm by mass or less, more preferably 1000 ppm by mass or less, even more preferably 850 ppm by mass or less, and particularly preferably 500 ppm by mass or less.

The solder alloy preferably satisfies the following formula (1).

$$275 \leq 2As + Sb + Bi + Pb \quad (1)$$

In the formula (1), As, Sb, Bi, and Pb each represents the amount thereof (ppm by mass) in the alloy constitution.

As, Sb, Bi and Pb are elements exhibiting viscosity-increase suppression effects. The total amount thereof is preferably 275 ppm by mass or more. In the formula (1), the amount of As is duplicated, because the viscosity-increase suppression effect exhibited by As is larger than that exhibited by Sb, Bi or Pb.

The value calculated by the formula (1) is preferably 350 or more, and more preferably 1200 or more. Although the value calculated by the formula (1) is not particularly limited from the viewpoint of the viscosity-increase suppression effect, the value calculated by the formula (1) is preferably 25200 or less, more preferably 10200 or less, even more preferably 5300 or less, and particularly preferably 3800 or less, from the viewpoint of providing an appropriate range of the ΔT.

Among the above-mentioned preferable embodiments, the upper limit and the lower limit are appropriately selected as shown in the following formulae (1a) and (1b).

$$275 \leq 2As + Sb + Bi + Pb \leq 25200 \quad (1a)$$

$$275 \leq 2As + Sb + Bi + Pb \leq 5300 \quad (1b)$$

In the formulae (1a) and (1b), As, Sb, Bi, and Pb each represents the amount thereof (ppm by mass) in the alloy constitution.

The solder alloy preferably satisfies the following formula (2).

$$0.01 \leq (2As + Sb)/(Bi + Pb) \leq 10.00 \quad (2)$$

In the formula (2), As, Sb, Bi, and Pb each represents the amount thereof (ppm by mass) in the alloy constitution.

In the case when the amount of As and Sb is large, the wettability of the solder alloy deteriorates. Although the presence of Bi and Pb suppresses the deterioration of the wettability caused by As, the presence of an excessively large amount of Bi and Pb increases ΔT. In the case of an alloy constitution in which both Bi and Pb are contained, ΔT tends to increase. Thus, ΔT is increased by excessively increasing the amount of Bi and Pb so as to improve the wettability. In contrast, the wettability deteriorates by increasing the amount of As or Sb so as to improve the viscosity-increase suppression effect. In the case where a group composed of As and Sb and a group composed of Bi and Pb are separated and the total amount of both groups is within an appropriate range, the viscosity-increase suppression effect, decrease in ΔT, and wettability are simultaneously realized.

In the case where the value calculated by the formula (2) is less than 0.01, the total amount of Bi and Pb is relatively larger than the total amount of As and Pb, and therefore ΔT is increased. The lower limit of the value calculated by the formula (2) is preferably 0.02 or more, more preferably 0.41 or more, even more preferably 0.90 or more, particularly preferably 1.00 or more, and most preferably 1.40 or more. In contrast, in the case where the value calculated by the formula (2) exceeds 10.00, the total amount of As and Sb is relatively larger than the total amount of Bi and Pb, and therefore the wettability deteriorates. The upper limit of the value calculated by the formula (2) is preferably 5.33 or less, more preferably 4.50 or less, even more preferably 2.67 or less, and particularly preferably 2.30 or less.

The denominator of the formula (2) is "Bi+Pb", and the formula (2) is not valid if Bi and Pb are absent. Accordingly, the solder alloy preferably contains at least one selected from the group consisting of Bi and Pb. In the case where Bi and Pb are absent in the alloy constitution, the wettability deteriorates as mentioned above.

Among the above-mentioned preferable embodiments, the upper limit and the lower limit are appropriately determined as shown in the following formula (2a).

$$0.31 \leq (2As + Sb)/(Bi + Pb) \leq 10.00 \quad (2a)$$

In the formula (2a), As, Sb, Bi and Pb each represents the amount thereof (ppm by mass) in the alloy constitution.

Ag is an arbitrary element that contributes to formation of $Ag_3Sn$ at the crystalline interface to improve the reliability of the solder alloy. Ag is a noble element relative to Sn in terms of an ionization tendency thereof, and the presence of Ag together with As, Pb and Bi enhances the viscosity-increase suppression effect thereof. The amount of Ag relative to the total mass of the solder alloy is preferably 0% by mass to 4% by mass, more preferably 0.5% by mass to 3.5% by mass, and even more preferably 1.0% by mass to 3.0% by mass.

Cu is an arbitrary element that contributes to improvement of the bonding strength of a solder joint. In addition, Cu is a noble element relative to Sn in terms of an ionization tendency thereof, and the presence of Cu together with As, Pb and Bi enhances the viscosity-increase suppression effect thereof. The amount of Cu relative to the total mass of the solder alloy is preferably 0% by mass to 0.9% by mass, more preferably 0.1% by mass to 0.8% by mass, and even more preferably 0.2% by mass to 0.7% by mass.

The balance of the solder alloy is preferably Sn. The solder alloy may further contain unavoidable impurities in addition to the above-mentioned elements. The inclusion of unavoidable impurities does not affect the aforementioned effects. Although the presence of an excessively large amount of In increases ΔT, the presence of 1000 ppm by mass or less of In does not affect the aforementioned effects.

<Functional Effects Exhibited by Solder Paste>

In the case where soldering is conducted in a reflow furnace using a solder paste containing a flux containing, relative to the total mass of the flux, 0.5% by mass to 20.0% by mass of a (carboxyalkyl)isocyanurate adduct, 5.0% by mass to 50.0% by mass of a rosin, and a solvent, an oxidized material that may cause poor wetting of the solder is removed, and the solder spreadability is improved.

The solder paste preferably contains a solder alloy in which As, Sb, Bi and Pb are contained in the above-mentioned amounts. In addition, the solder alloy in which As, Sb, Bi and Pb are contained in the above-mentioned amounts preferably satisfies the above-mentioned formulae (1), and more preferably satisfies the formulae (1a) and (1b). The solder alloy in which As, Sb, Bi and Pb are contained in the above-mentioned amounts preferably satisfies the above-mentioned formula (2), and more preferably satisfies the formula (2a).

EXAMPLES

Fluxes, each having a constitution shown in the following Tables 1 to 9, were prepared in examples and comparative examples and the solder spreadability was evaluated. The constitution ratio in Tables 1 to 9 is indicated by "% by mass" when the total mass of the flux was 100, and blank columns in the tables indicate 0% by mass.

<Evaluation of Solder Spreadability>

(1) Evaluation Method

The solderability was evaluated by coating a flux composition of each of examples and comparative examples on a Cu plate, mounting a solder ball on the flux composition coated on the Cu plate, reflowing the resultant, and then measuring a wet-spread diameter of a solder. The solder was a Sn—Ag—Cu-based solder alloy composed of 3.0% by mass of Ag, 0.5% by mass of Cu, and a balance of Sn.

First, flux printing was performed on a bare Cu plate having a length of 30 mm, a width of 30 mm, and a thickness of 0.3 mm, using a squeegee with a mask having an opening diameter φ of 0.23 mm and a thickness of 0.1 mm, the mask being generally used to evaluate a φ 0.3 mm ball. One φ 0.3 mm solder ball was placed in each printing area of the mask opening at a flux printing portion of the Cu plate, and then subjected to atmospheric reflowing in a high-temperature observation device in a state where 10 or more solder balls were placed on one sheet of the Cu plate. As the reflow conditions, preheating was performed at 190° C. for 120 seconds in an atmospheric condition, and then main heating was performed by increasing the temperature from 190° C. to 260° C. at a temperature increase rate of 1° C./sec.

The wet-spread diameter of solder was measured in 4 directions composed of a vertical direction, a horizontal direction, a right oblique direction, and a left oblique direction, per bump, and an arithmetic average value thereof was taken as a wet-spread diameter of the solder of one bump. The arithmetic average value of 10 bumps was set as the wet-spread diameter of solder.

(2) Evaluation Criteria

A: Solder was wet-spread to a diameter of 0.4 mm (=400 um) or more.

B: Solder was wet-spread to a diameter of less than 0.4 mm.

TABLE 1

| Material Category | | Material kind | Example | | | | | | | | |
|---|---|---|---|---|---|---|---|---|---|---|---|
| | | | A1 | A2 | A3 | A4 | A5 | A6 | A7 | A8 | A9 |
| Resin | Rosin | Polymerized rosin | 45 | | | 25 | 45 | 45 | 45 | 45 | 45 |
| | | Hydrogenated rosin | | 45 | | | | | | | |
| | | Acid-modified rosin | | | 45 | 20 | | | | | |
| | Other resin | Acrylic resin | | | | | | | | | |
| | | Acrylic polyethylene copolymer resin | | | | | | | | | |
| Activator | Organic acid | Glutaric acid | | | | | | | | | 5 |
| | | Adipic acid | | | | | | | | | |
| | | Hydrogenated dimer acid | | | | | | | | | |
| | (Carboxyalkyl) isocyanurate adduct | Tris(2-carboxyethyl) isocyanurate | 5 | 5 | 5 | 5 | 20 | 20 | 20 | 5 | 0.5 |

TABLE 1-continued

|  | Material Category | | Material kind | | | | | | | | | |
|---|---|---|---|---|---|---|---|---|---|---|---|---|
|  |  | Amine | Monoethanolamine | 5 | 5 | 5 | 5 |  | 0.1 | 0.5 | 10 | 10 |
|  |  |  | Diphenylguanidine |  |  |  |  |  |  |  |  |  |
|  |  |  | 2-Phenylimidazole |  |  |  |  |  |  |  |  |  |
|  |  |  | 2-Phenyl-4-methylimidazole |  |  |  |  |  |  |  |  |  |
|  |  | Organic halogen compound | Trans-2,3- dibromo-1,4-butenediol | 1 | 1 | 1 | 1 | 1 | 1 | 1 | 1 | 1 |
|  |  |  | Triallyl isocyanurate hexabromide |  |  |  |  |  |  |  |  |  |
|  |  | Amine halogenated hydroacid salt | Aniline•HCl |  |  |  |  |  |  |  |  |  |
|  |  |  | Aniline•HBr |  |  |  |  |  |  |  |  |  |
| Solvent |  | Solvent | Hexyl diglycol | 39 | 39 | 39 | 39 | 29 | 28.9 | 28.5 | 34 | 33.5 |
| Thixo agent |  | Ester-based thixo agent | Hardened castor oil | 5 | 5 | 5 | 5 | 5 | 5 | 5 | 5 | 5 |
|  |  | Amide-based thixo agent | Polyamide-based thixo agent |  |  |  |  |  |  |  |  |  |
|  |  |  | Bisamide-based thixo agent |  |  |  |  |  |  |  |  |  |
|  |  |  | Amide-based thixo agent |  |  |  |  |  |  |  |  |  |
|  | Total amount | | | 100 | 100 | 100 | 100 | 100 | 100 | 100 | 100 | 100 |
| Evaluation |  | Spreadability | | A | A | A | A | A | A | A | A | A |

|  |  |  |  | Example | | | | |
|---|---|---|---|---|---|---|---|---|
| Material Category | | Material kind | | A10 | A11 | A12 | A13 | A14 |
|  | Resin | Rosin | Polymerized rosin | 45 | 45 | 45 | 45 | 45 |
|  |  |  | Hydrogenated rosin |  |  |  |  |  |
|  |  |  | Acid-modified rosin |  |  |  |  |  |
|  |  | Other resin | Acrylic resin |  |  |  |  |  |
|  |  |  | Acrylic polyethylene copolymer resin |  |  |  |  |  |
|  | Activator | Organic acid | Glutaric acid | 5 | 5 | 5 | 10 |  |
|  |  |  | Adipic acid |  |  |  |  | 5 |
|  |  |  | Hydrogenated dimer acid |  |  |  |  |  |
|  |  | (Carboxyalkyl) isocyanurate adduct | Tris(2-carboxyethyl) isocyanurate | 5 | 5 | 5 | 5 | 5 |
|  |  | Amine | Monoethanolamine |  |  |  |  |  |
|  |  |  | Diphenylguanidine | 2 |  |  |  |  |
|  |  |  | 2-Phenylimidazole |  | 2 |  |  |  |
|  |  |  | 2-Phenul-4-methylimidazole |  |  | 2 |  |  |
|  |  | Organic halogen compound | Trans-2,3- dibromo-1,4-butenediol | 1 | 1 | 1 | 1 | 1 |
|  |  |  | Triallyl isocyanurate hexabromide |  |  |  |  |  |
|  |  | Amine halogenated hydroacid salt | Aniline•HCl |  |  |  |  |  |
|  |  |  | Aniline•HBr |  |  |  |  |  |
| Solvent |  | Solvent | Hexyl diglycol | 37 | 37 | 37 | 34 | 39 |
| Thixo agent |  | Ester-based thixo agent | Hardened castor oil | 5 | 5 | 5 | 5 | 5 |
|  |  | Amide-based thixo agent | Polyamide-based thixo agent |  |  |  |  |  |
|  |  |  | Bisamide-based thixo agent |  |  |  |  |  |
|  |  |  | Amide-based thixo agent |  |  |  |  |  |
|  | Total amount | | | 100 | 100 | 100 | 100 | 100 |
| Evaluation |  | Spreadability | | A | A | A | A | A |

TABLE 2

|  |  |  | Example | | | | | | | | |
|---|---|---|---|---|---|---|---|---|---|---|---|
| Material Category | | Material kind | A15 | A16 | A17 | A18 | A19 | A20 | A21 | A22 | A23 |
| Resin | Rosin | Polymerized rosin | 45 | 45 | 45 | 45 | 45 | 45 | 45 | 45 | 45 |
|  |  | Hydrogenated rosin |  |  |  |  |  |  |  |  |  |
|  |  | Acid-modified rosin |  |  |  |  |  | 5 |  |  |  |
|  | Other resin | Acrylic resin |  |  |  |  |  |  |  |  |  |
|  |  | Acrylic polyethylene copolymer resin |  |  |  |  |  |  |  |  |  |
| Activator | Organic acid | Glutaric acid | 5 | 5 | 5 | 5 | 5 |  |  |  |  |
|  |  | Adipic acid |  |  |  |  |  |  |  |  |  |
|  |  | Hydrogenated dimer acid |  |  |  |  |  |  |  |  |  |
|  | (Carboxyalkyl) isocyanurate adduct | Tris(2-carboxyethyl) isocyanurate | 5 | 5 | 5 | 5 | 5 | 5 | 5 | 5 | 5 |

TABLE 2-continued

| | | | | | | | | | | | | |
|---|---|---|---|---|---|---|---|---|---|---|---|---|
| | Amine | Monoethanolamine | 5 | 5 | 5 | 5 | 5 | 5 | 5 | 5 | 5 |
| | | Diphenylguanidine | | | | | | | | | |
| | | 2-Phenylimidazole | | | | | | | | | |
| | | 2-Phenyl-4-methylimidazole | | | | | | | | | |
| | Organic halogen compound | Trans-2,3- dibromo-1,4-butenediol | | 5 | | | | 1 | 1 | 1 | 1 |
| | | Triallyl isocyanurate hexabromide | | | 1 | | | | | | |
| | Amine halogenated hydroacid salt | Aniline•HCl | | | | 1 | | | | | |
| | | Aniline•HBr | | | | | 5 | | | | |
| Solvent | Solvent | Hexyl diglycol | 35 | 30 | 34 | 34 | 30 | 39 | 39 | 39 | 39 |
| Thixo agent | Ester-based thixo agent | Hardened castor oil | 5 | 5 | 5 | 5 | 5 | | | | |
| | Amide-based thixo agent | Polyamide-based thixo agent | | | | | | | 5 | | |
| | | Bisamide-based thixo agent | | | | | | | | 5 | |
| | | Amide-based thixo agent | | | | | | | | | 5 |
| | | Total amount | 100 | 100 | 100 | 100 | 100 | 100 | 100 | 100 | 100 |
| Evaluation | | Spreadability | A | A | A | A | A | A | A | A | A |

| | | | Example | | | Comparative Example | |
|---|---|---|---|---|---|---|---|
| Material Category | | Material kind | A24 | A25 | A26 | A1 | A2 |
| Resin | Rosin | Polymerized rosin | 25 | 40 | 5 | 45 | 45 |
| | | Hydrogenated rosin | | | | | |
| | | Acid-modified rosin | | | | | |
| | Other resin | Acrylic resin | 10 | 5 | 20 | | |
| | | Acrylic polyethylene copolymer resin | 10 | | 10 | | |
| Activator | Organic acid | Glutaric acid | | | | 5 | |
| | | Adipic acid | | | 5 | | 5 |
| | | Hydrogenated dimer acid | | | 5 | | |
| | (Carboxyalkyl) isocyanurate adduct | Tris(2-carboxyethyl) isocyanurate | 5 | 5 | 5 | | |
| | Amine | Monoethanolamine | 5 | 5 | 5 | 5 | 5 |
| | | Diphenylguanidine | | | | | |
| | | 2-Phenylimidazole | | | | | |
| | | 2-Phenyl-4-methylimidazole | | | | | |
| | Organic halogen compound | Trans-2,3- dibromo-1,4-butenediol | 1 | 1 | 1 | 1 | 1 |
| | | Triallyl isocyanurate hexabromide | | | | | |
| | Amine halogenated hydroacid salt | Aniline•HCl | | | | | |
| | | Aniline•HBr | | | | | |
| Solvent | Solvent | Hexyl diglycol | 39 | 39 | 39 | 39 | 39 |
| Thixo agent | Ester-based thixo agent | Hardened castor oil | 5 | 5 | 5 | 5 | 5 |
| | Amide-based thixo agent | Polyamide-based thixo agent | | | | | |
| | | Bisamide-based thixo agent | | | | | |
| | | Amide-based thixo agent | | | | | |
| | | Total amount | 100 | 100 | 100 | 100 | 100 |
| Evaluation | | Spreadability | A | A | A | B | B |

TABLE 3

| | | | Example | | | | | | | | |
|---|---|---|---|---|---|---|---|---|---|---|---|
| Material Category | | Material kind | B1 | B2 | B3 | B4 | B5 | B6 | B7 | B8 | B9 |
| Resin | Rosin | Polymerized rosin | 45 | | | 25 | 45 | 45 | 45 | 45 | 45 |
| | | Hydrogenated rosin | | 45 | | | | | | | |
| | | Acid-modified rosin | | | 45 | 20 | | | | | |
| | Other resin | Acrylic resin | | | | | | | | | |
| | | Acrylic polyethylene copolymer resin | | | | | | | | | |
| Activator | Organic acid | Glutaric acid | | | | | | | | | 5 |
| | | Adipic acid | | | | | | | | | |
| | | Hydrogenated dimer acid | | | | | | | | | |
| | (Carboxyalkyl) isocyanurate adduct | Tris(1-carboxymethyl) isocyanurate | 5 | 5 | 5 | 5 | 20 | 20 | 20 | 5 | 0.5 |

TABLE 3-continued

|  |  |  | B1 | B2 | B3 | B4 | B5 | B6 | B7 | B8 | B9 |
|---|---|---|---|---|---|---|---|---|---|---|---|
|  | Amine | Monoethanolamine | 5 | 5 | 5 | 5 |  | 0.1 | 0.5 | 10 | 10 |
|  |  | Diphenylguanidine |  |  |  |  |  |  |  |  |  |
|  |  | 2-Phenylimidazole |  |  |  |  |  |  |  |  |  |
|  |  | 2-Phenyl-4-methylimidazole |  |  |  |  |  |  |  |  |  |
|  | Organic halogen compound | Trans-2,3- dibromo-1,4-butenediol | 1 | 1 | 1 | 1 | 1 | 1 | 1 | 1 | 1 |
|  |  | Triallyl isocyanurate hexabromide |  |  |  |  |  |  |  |  |  |
|  | Amine halogenated hydroacid salt | Aniline•HCl |  |  |  |  |  |  |  |  |  |
|  |  | Aniline•HBr |  |  |  |  |  |  |  |  |  |
| Solvent | Solvent | Hexyl diglycol | 39 | 39 | 39 | 39 | 29 | 28.9 | 28.5 | 34 | 33.5 |
| Thixo agent | Ester-based thixo agent | Hardened castor oil | 5 | 5 | 5 | 5 | 5 | 5 | 5 | 5 | 5 |
|  | Amide-based thixo agent | Polyamide-based thixo agent |  |  |  |  |  |  |  |  |  |
|  |  | Bisamide-based thixo agent |  |  |  |  |  |  |  |  |  |
|  |  | Amide-based thixo agent |  |  |  |  |  |  |  |  |  |
|  | Total amount |  | 100 | 100 | 100 | 100 | 100 | 100 | 100 | 100 | 100 |
| Evaluation | Spreadability |  | A | A | A | A | A | A | A | A | A |

|  |  |  | Example |  |  |  |  |
|---|---|---|---|---|---|---|---|
| Material Category |  | Material kind | B10 | B11 | B12 | B13 | B14 |
| Resin | Rosin | Polymerized rosin | 45 | 45 | 45 | 45 | 45 |
|  |  | Hydrogenated rosin |  |  |  |  |  |
|  |  | Acid-modified rosin |  |  |  |  |  |
|  | Other resin | Acrylic resin |  |  |  |  |  |
|  |  | Acrylic polyethylene copolymer resin |  |  |  |  |  |
| Activator | Organic acid | Glutaric acid | 5 | 5 | 5 | 10 |  |
|  |  | Adipic acid |  |  |  |  | 5 |
|  |  | Hydrogenated dimer acid |  |  |  |  |  |
|  | (Carboxyalkyl) isocyanurate adduct | Tris(1-carboxymethyl) isocyanurate | 5 | 5 | 5 | 5 | 5 |
|  | Amine | Monoethanolamine | 2 |  |  |  |  |
|  |  | Diphenylguanidine |  |  |  |  |  |
|  |  | 2-Phenylimidazole |  | 2 |  |  |  |
|  |  | 2-Phenyl-4-methylimidazole |  |  | 2 |  |  |
|  | Organic halogen compound | Trans-2,3- dibromo-1,4-butenediol | 1 | 1 | 1 | 1 | 1 |
|  |  | Triallyl isocyanurate hexabromide |  |  |  |  |  |
|  | Amine halogenated hydroacid salt | Aniline•HCl |  |  |  |  |  |
|  |  | Aniline•HBr |  |  |  |  |  |
| Solvent | Solvent | Hexyl diglycol | 37 | 37 | 37 | 34 | 39 |
| Thixo agent | Ester-based thixo agent | Hardened castor oil | 5 | 5 | 5 | 5 | 5 |
|  | Amide-based thixo agent | Polyamide-based thixo agent |  |  |  |  |  |
|  |  | Bisamide-based thixo agent |  |  |  |  |  |
|  |  | Amide-based thixo agent |  |  |  |  |  |
|  | Total amount |  | 100 | 100 | 100 | 100 | 100 |
| Evaluation | Spreadability |  | A | A | A | A | A |

TABLE 4

|  |  |  | Example |  |  |  |  |  |  |  |  |
|---|---|---|---|---|---|---|---|---|---|---|---|
| Material Category |  | Material kind | B15 | B16 | B17 | B18 | B19 | B20 | B21 | B22 | B23 |
| Resin | Rosin | Polymerized rosin | 45 | 45 | 45 | 45 | 45 | 45 | 45 | 45 | 45 |
|  |  | Hydrogenated rosin |  |  |  |  |  |  |  |  |  |
|  |  | Acid-modified rosin |  |  |  |  |  | 5 |  |  |  |
|  | Other resin | Acrylic resin |  |  |  |  |  |  |  |  |  |
|  |  | Acrylic polyethylene copolymer resin |  |  |  |  |  |  |  |  |  |
| Activator | Organic acid | Glutaric acid | 5 | 5 | 5 | 5 | 5 |  |  |  |  |
|  |  | Adipic acid |  |  |  |  |  |  |  |  |  |
|  |  | Hydrogenated dimer acid |  |  |  |  |  |  |  |  |  |
|  | (Carboxyalkyl) isocyanurate adduct | Tris(1-carboxymethyl) isocyanurate | 5 | 5 | 5 | 5 | 5 | 5 | 5 | 5 | 5 |

TABLE 4-continued

| | Material Category | | Material kind | | | | | | | | | |
|---|---|---|---|---|---|---|---|---|---|---|---|---|
| | | Amine | Monoethanolamine | 5 | 5 | 5 | 5 | 5 | 5 | 5 | 5 | 5 |
| | | | Diphenylguanidine | | | | | | | | | |
| | | | 2-Phenylimidazole | | | | | | | | | |
| | | | 2-Phenyl-4-methylimidazole | | | | | | | | | |
| | | Organic halogen compound | Trans-2,3- dibromo-1,4-butenediol | | 5 | | | | 1 | 1 | 1 | 1 |
| | | | Triallyl isocyanurate hexabromide | | | 1 | | | | | | |
| | | Amine halogenated hydroacid salt | Aniline•HCl | | | | 1 | | | | | |
| | | | Aniline•HBr | | | | | 5 | | | | |
| Solvent | Solvent | | Hexyl diglycol | 35 | 30 | 34 | 34 | 30 | 39 | 39 | 39 | 39 |
| Thixo agent | Ester-based thixo agent | | Hardened castor oil | 5 | 5 | 5 | 5 | 5 | | | | |
| | Amide-based thixo agent | | Polyamide-based thixo agent | | | | | | | 5 | | |
| | | | Bisamide-based thixo agent | | | | | | | | 5 | |
| | | | Amide-based thixo agent | | | | | | | | | 5 |
| | | Total amount | | 100 | 100 | 100 | 100 | 100 | 100 | 100 | 100 | 100 |
| Evaluation | | Spreadability | | A | A | A | A | A | A | A | A | A |

| | | | | Example | | | Comparative Example | |
|---|---|---|---|---|---|---|---|---|
| | Material Category | | Material kind | B24 | B25 | B26 | B1 | B2 |
| Resin | Rosin | | Polymerized rosin | 25 | 40 | 5 | 45 | 45 |
| | | | Hydrogenated rosin | | | | | |
| | | | Acid-modified rosin | | | | | |
| | Other resin | | Acrylic resin | 10 | 5 | 20 | | |
| | | | Acrylic polyethylene copolymer resin | 10 | | 10 | | |
| Activator | Organic acid | | Glutaric acid | | | | 5 | |
| | | | Adipic acid | | | 5 | | 5 |
| | | | Hydrogenated dimer acid | | | 5 | | |
| | (Carboxyalkyl) isocyanurate adduct | | Tris(1-carboxymethyl) isocyanurate | 5 | 5 | 5 | | |
| | Amine | | Monoethanolamine | 5 | 5 | 5 | 5 | 5 |
| | | | Diphenylguanidine | | | | | |
| | | | 2-Phenylimidazole | | | | | |
| | | | 2-Phenyl-4-methylimidazole | | | | | |
| | Organic halogen compound | | Trans-2,3- dibromo-1,4-butenediol | 1 | 1 | 1 | 1 | 1 |
| | | | Triallyl isocyanurate hexabromide | | | | | |
| | Amine halogenated hydroacid salt | | Aniline•HCl | | | | | |
| | | | Aniline•HBr | | | | | |
| Solvent | Solvent | | Hexyl diglycol | 39 | 39 | 39 | 39 | 39 |
| Thixo agent | Ester-based thixo agent | | Hardened castor oil | 5 | 5 | 5 | 5 | 5 |
| | Amide-based thixo agent | | Polyamide-based thixo agent | | | | | |
| | | | Bisamide-based thixo agent | | | | | |
| | | | Amide-based thixo agent | | | | | |
| | | Total amount | | 100 | 100 | 100 | 100 | 100 |
| Evaluation | | Spreadability | | A | A | A | B | B |

TABLE 5

| | | | Example | | | | | | | | | |
|---|---|---|---|---|---|---|---|---|---|---|---|---|
| Material Category | | Material kind | C1 | C2 | C3 | C4 | C5 | C6 | C7 | C8 | C9 |
| Resin | Rosin | Polymerized rosin | 45 | | | 25 | 45 | 45 | 45 | 45 | 45 |
| | | Hydrogenated rosin | | 45 | | | | | | | |
| | | Acid-modified rosin | | | 45 | 20 | | | | | |
| | Other resin | Acrylic resin | | | | | | | | | |
| | | Acrylic polyethylene copolymer resin | | | | | | | | | |
| Activator | Organic acid | Glutaric acid | | | | | | | | | 5 |
| | | Adipic acid | | | | | | | | | |
| | | Hydrogenated dimer acid | | | | | | | | | |
| | (Carboxyalkyl) isocyanurate adduct | Tris(3-carboxypropyl) isocyanurate | 5 | 5 | 5 | 5 | 20 | 20 | 20 | 5 | 0.5 |

TABLE 5-continued

| | | | | | | | | | | | | |
|---|---|---|---|---|---|---|---|---|---|---|---|---|
| | Amine | Monoethanolamine | 5 | 5 | 5 | 5 | | 0.1 | 0.5 | 10 | 10 |
| | | Diphenylguanidine | | | | | | | | | |
| | | 2-Phenylimidazole | | | | | | | | | |
| | | 2-Phenyl-4-methylimidazole | | | | | | | | | |
| | Organic halogen compound | Trans-2,3- dibromo-1,4-butenediol | 1 | 1 | 1 | 1 | 1 | 1 | 1 | 1 | 1 |
| | | Triallyl isocyanurate hexabromide | | | | | | | | | |
| | Amine halogenated hydroacid salt | Aniline•HCl | | | | | | | | | |
| | | Aniline•HBr | | | | | | | | | |
| Solvent | Solvent | Hexyl diglycol | 39 | 39 | 39 | 39 | 29 | 28.9 | 28.5 | 34 | 33.5 |
| Thixo agent | Ester-based thixo agent | Hardened castor oil | 5 | 5 | 5 | 5 | 5 | 5 | 5 | 5 | 5 |
| | Amide-based thixo agent | Polyamide-based thixo agent | | | | | | | | | |
| | | Bisamide-based thixo agent | | | | | | | | | |
| | | Amide-based thixo agent | | | | | | | | | |
| | | Total amount | 100 | 100 | 100 | 100 | 100 | 100 | 100 | 100 | 100 |
| Evaluation | | Spreadability | A | A | A | A | A | A | A | A | A |

| | | | Example | | | | |
|---|---|---|---|---|---|---|---|
| Material Category | | Material kind | C10 | C11 | C12 | C13 | C14 |
| Resin | Rosin | Polymerized rosin | 45 | 45 | 45 | 45 | 45 |
| | | Hydrogenated rosin | | | | | |
| | | Acid-modified rosin | | | | | |
| | Other resin | Acrylic resin | | | | | |
| | | Acrylic polyethylene copolymer resin | | | | | |
| Activator | Organic acid | Glutaric acid | 5 | 5 | 5 | 10 | |
| | | Adipic acid | | | | | 5 |
| | | Hydrogenated dimer acid | | | | | |
| | (Carboxyalkyl) isocyanurate adduct | Tris(3-carboxypropyl) isocyanurate | 5 | 5 | 5 | 5 | 5 |
| | Amine | Monoethanolamine | | | | | |
| | | Diphenylguanidine | 2 | | | | |
| | | 2-Phenylimidazole | | 2 | | | |
| | | 2-Phenyl-4-methylimidazole | | | 2 | | |
| | Organic halogen compound | Trans-2,3- dibromo-1,4-butenediol | 1 | 1 | 1 | 1 | 1 |
| | | Triallyl isocyanurate hexabromide | | | | | |
| | Amine halogenated hydroacid salt | Aniline•HCl | | | | | |
| | | Aniline•HBr | | | | | |
| Solvent | Solvent | Hexyl diglycol | 37 | 37 | 37 | 34 | 39 |
| Thixo agent | Ester-based thixo agent | Hardened castor oil | 5 | 5 | 5 | 5 | 5 |
| | Amide-based thixo agent | Polyamide-based thixo agent | | | | | |
| | | Bisamide-based thixo agent | | | | | |
| | | Amide-based thixo agent | | | | | |
| | | Total amount | 100 | 100 | 100 | 100 | 100 |
| Evaluation | | Spreadability | A | A | A | A | A |

TABLE 6

| | | | Example | | | | | | | | |
|---|---|---|---|---|---|---|---|---|---|---|---|
| Material Category | | Material kind | C15 | C16 | C17 | C18 | C19 | C20 | C21 | C22 | C23 |
| Resin | Rosin | Polymerized rosin | 45 | 45 | 45 | 45 | 45 | 45 | 45 | 45 | 45 |
| | | Hydrogenated rosin | | | | | | | | | |
| | | Acid-modified rosin | | | | | | 5 | | | |
| | Other resin | Acrylic resin | | | | | | | | | |
| | | Acrylic polyethylene copolymer resin | | | | | | | | | |
| Activator | Organic acid | Glutaric acid | 5 | 5 | 5 | 5 | 5 | | | | |
| | | Adipic acid | | | | | | | | | |
| | | Hydrogenated dimer acid | | | | | | | | | |
| | (Carboxyalkyl) isocyanurate adduct | Tris(3-carboxypropyl) isocyanurate | 5 | 5 | 5 | 5 | 5 | 5 | 5 | 5 | 5 |

TABLE 6-continued

| | Material Category | | Material kind | | | | | | | | | |
|---|---|---|---|---|---|---|---|---|---|---|---|---|
| | | Amine | Monoethanolamine | 5 | 5 | 5 | 5 | 5 | 5 | 5 | 5 | 5 |
| | | | Diphenylguanidine | | | | | | | | | |
| | | | 2-Phenylimidazole | | | | | | | | | |
| | | | 2-Phenyl-4-methylimidazole | | | | | | | | | |
| | | Organic halogen compound | Trans-2,3- dibromo-1,4-butenediol | | 5 | | | | 1 | 1 | 1 | 1 |
| | | | Triallyl isocyanurate hexabromide | | | 1 | | | | | | |
| | | Amine halogenated hydroacid salt | Aniline•HCl | | | | 1 | | | | | |
| | | | Aniline•HBr | | | | | 5 | | | | |
| Solvent | Solvent | | Hexyl diglycol | 35 | 30 | 34 | 34 | 30 | 39 | 39 | 39 | 39 |
| Thixo agent | Ester-based thixo agent | | Hardened castor oil | 5 | 5 | 5 | 5 | 5 | | | | |
| | Amide-based thixo agent | | Polyamide-based thixo agent | | | | | | | 5 | | |
| | | | Bisamide-based thixo agent | | | | | | | | 5 | |
| | | | Amide-based thixo agent | | | | | | | | | 5 |
| | | Total amount | | 100 | 100 | 100 | 100 | 100 | 100 | 100 | 100 | 100 |
| Evaluation | | Spreadability | | A | A | A | A | A | A | A | A | A |

| | | | | Example | | | Comparative Example | |
|---|---|---|---|---|---|---|---|---|
| | Material Category | | Material kind | C24 | C25 | C26 | C1 | C2 |
| | Resin | Rosin | Polymerized rosin | 25 | 40 | 5 | 45 | 45 |
| | | | Hydrogenated rosin | | | | | |
| | | | Acid-modified rosin | | | | | |
| | | Other resin | Acrylic resin | 10 | 5 | 20 | | |
| | | | Acrylic polyethylene copolymer resin | 10 | | 10 | | |
| | Activator | Organic acid | Glutaric acid | | | | 5 | |
| | | | Adipic acid | | | | 5 | 5 |
| | | | Hydrogenated dimer acid | | | | 5 | |
| | | (Carboxyalkyl) isocyanurate adduct | Tris(3-carboxypropyl) isocyanurate | 5 | 5 | 5 | | |
| | | Amine | Monoethanolamine | 5 | 5 | 5 | 5 | 5 |
| | | | Diphenylguanidine | | | | | |
| | | | 2-Phenylimidazole | | | | | |
| | | | 2-Phenyl-4-methylimidazole | | | | | |
| | | Organic halogen compound | Trans-2,3- dibromo-1,4-butenediol | 1 | 1 | 1 | 1 | 1 |
| | | | Triallyl isocyanurate hexabromide | | | | | |
| | | Amine halogenated hydroacid salt | Aniline•HCl | | | | | |
| | | | Aniline•HBr | | | | | |
| Solvent | Solvent | | Hexyl diglycol | 39 | 39 | 39 | 39 | 39 |
| Thixo agent | Ester-based thixo agent | | Hardened castor oil | 5 | 5 | 5 | 5 | 5 |
| | Amide-based thixo agent | | Polyamide-based thixo agent | | | | | |
| | | | Bisamide-based thixo agent | | | | | |
| | | | Amide-based thixo agent | | | | | |
| | | Total amount | | 100 | 100 | 100 | 100 | 100 |
| Evaluation | | Spreadability | | A | A | A | B | B |

TABLE 7

| | | | Example | | | | | | | | |
|---|---|---|---|---|---|---|---|---|---|---|---|
| Material Category | | Material kind | D1 | D2 | D3 | D4 | D5 | D6 | D7 | D8 | D9 |
| Resin | Rosin | Polymerized rosin | 45 | | | 25 | 45 | 45 | 45 | 45 | 45 |
| | | Hydrogenated rosin | | 45 | | | | | | | |
| | | Acid-modified rosin | | | 45 | 20 | | | | | |
| | Other resin | Acrylic resin | | | | | | | | | |
| | | Acrylic polyethylene copolymer resin | | | | | | | | | |
| Activator | Organic acid | Glutaric acid | | | | | | | | | 5 |
| | | Adipic acid | | | | | | | | | |
| | | Hydrogenated dimer acid | | | | | | | | | |
| | (Carboxyalkyl) isocyanurate adduct | Bis(2-carboxyethyl) isocyanurate | 5 | 5 | 5 | 5 | 20 | 20 | 20 | 5 | 0.5 |

TABLE 7-continued

|  |  |  |  |  |  |  |  |  |  |  |  |
|---|---|---|---|---|---|---|---|---|---|---|---|
|  | Amine | Monoethanolamine | 5 | 5 | 5 | 5 |  | 0.1 | 0.5 | 10 | 10 |
|  |  | Diphenylguanidine |  |  |  |  |  |  |  |  |  |
|  |  | 2-Phenylimidazole |  |  |  |  |  |  |  |  |  |
|  |  | 2-Phenyl-4-methylimidazole |  |  |  |  |  |  |  |  |  |
|  | Organic halogen compound | Trans-2,3- dibromo-1,4-butenediol | 1 | 1 | 1 | 1 | 1 | 1 | 1 | 1 | 1 |
|  |  | Triallyl isocyanurate hexabromide |  |  |  |  |  |  |  |  |  |
|  | Amine halogenated hydroacid salt | Aniline•HCl |  |  |  |  |  |  |  |  |  |
|  |  | Aniline•HBr |  |  |  |  |  |  |  |  |  |
| Solvent | Solvent | Hexyl diglycol | 39 | 39 | 39 | 39 | 29 | 28.9 | 28.5 | 34 | 33.5 |
| Thixo agent | Ester-based thixo agent | Hardened castor oil | 5 | 5 | 5 | 5 | 5 | 5 | 5 | 5 | 5 |
|  | Amide-based thixo agent | Polyamide-based thixo agent |  |  |  |  |  |  |  |  |  |
|  |  | Bisamide-based thixo agent |  |  |  |  |  |  |  |  |  |
|  |  | Amide-based thixo agent |  |  |  |  |  |  |  |  |  |
|  | Total amount |  | 100 | 100 | 100 | 100 | 100 | 100 | 100 | 100 | 100 |
| Evaluation | Spreadability |  | A | A | A | A | A | A | A | A | A |

|  |  |  | Example |  |  |  |  |
|---|---|---|---|---|---|---|---|
|  | Material Category | Material kind | D10 | D11 | D12 | D13 | D14 |
|  | Resin | Rosin | Polymerized rosin | 45 | 45 | 45 | 45 | 45 |
|  |  |  | Hydrogenated rosin |  |  |  |  |  |
|  |  |  | Acid-modified rosin |  |  |  |  |  |
|  |  | Other resin | Acrylic resin |  |  |  |  |  |
|  |  |  | Acrylic polyethylene copolymer resin |  |  |  |  |  |
|  | Activator | Organic acid | Glutaric acid | 5 | 5 | 5 | 10 |  |
|  |  |  | Adipic acid |  |  |  |  | 5 |
|  |  |  | Hydrogenated dimer acid |  |  |  |  |  |
|  |  | (Carboxyalkyl) isocyanurate adduct | Bis(2-carboxyethyl) isocyanurate | 5 | 5 | 5 | 5 | 5 |
|  |  | Amine | Monoethanolamine |  |  |  |  |  |
|  |  |  | Diphenylguanidine | 2 |  |  |  |  |
|  |  |  | 2-Phenylimidazole |  | 2 |  |  |  |
|  |  |  | 2-Phenyl-4-methylimidazole |  |  | 2 |  |  |
|  |  | Organic halogen compound | Trans-2,3- dibromo-1,4-butenediol | 1 | 1 | 1 | 1 | 1 |
|  |  |  | Triallyl isocyanurate hexabromide |  |  |  |  |  |
|  |  | Amine halogenated hydroacid salt | Aniline•HCl |  |  |  |  |  |
|  |  |  | Aniline•HBr |  |  |  |  |  |
|  | Solvent | Solvent | Hexyl diglycol | 37 | 37 | 37 | 34 | 39 |
|  | Thixo agent | Ester-based thixo agent | Hardened castor oil | 5 | 5 | 5 | 5 | 5 |
|  |  | Amide-based thixo agent | Polyamide-based thixo agent |  |  |  |  |  |
|  |  |  | Bisamide-based thixo agent |  |  |  |  |  |
|  |  |  | Amide-based thixo agent |  |  |  |  |  |
|  |  | Total amount |  | 100 | 100 | 100 | 100 | 100 |
|  | Evaluation | Spreadability |  | A | A | A | A | A |

TABLE 8

|  |  |  | Example |  |  |  |  |  |  |  |  |
|---|---|---|---|---|---|---|---|---|---|---|---|
| Material Category |  | Material kind | D15 | D16 | D17 | D18 | D19 | D20 | D21 | D22 | D23 |
| Resin | Rosin | Polymerized rosin | 45 | 45 | 45 | 45 | 45 | 45 | 45 | 45 | 45 |
|  |  | Hydrogenated rosin |  |  |  |  |  |  |  |  |  |
|  |  | Acid-modified rosin |  |  |  |  |  | 5 |  |  |  |
|  | Other resin | Acrylic resin |  |  |  |  |  |  |  |  |  |
|  |  | Acrylic polyethylene copolymer resin |  |  |  |  |  |  |  |  |  |
| Activator | Organic acid | Glutaric acid | 5 | 5 | 5 | 5 | 5 |  |  |  |  |
|  |  | Adipic acid |  |  |  |  |  |  |  |  |  |
|  |  | Hydrogenated dimer acid |  |  |  |  |  |  |  |  |  |
|  | (Carboxyalkyl) isocyanurate adduct | Bis(2-carboxyethyl) isocyanurate | 5 | 5 | 5 | 5 | 5 | 5 | 5 | 5 | 5 |

TABLE 8-continued

| Material Category | | Material kind | | | | | | | | | |
|---|---|---|---|---|---|---|---|---|---|---|---|
| | Amine | Monoethanolamine | 5 | 5 | 5 | 5 | 5 | 5 | 5 | 5 | 5 |
| | | Diphenylguanidine | | | | | | | | | |
| | | 2-Phenylimidazole | | | | | | | | | |
| | | 2-Phenyl-4-methylimidazole | | | | | | | | | |
| | Organic halogen compound | Trans-2,3- dibromo-1,4-butenediol | | 5 | | | | 1 | 1 | 1 | 1 |
| | | Triallyl isocyanurate hexabromide | | | 1 | | | | | | |
| | Amine halogenated hydroacid salt | Aniline•HCl | | | | 1 | | | | | |
| | | Aniline•HBr | | | | | 5 | | | | |
| Solvent | Solvent | Hexyl diglycol | 35 | 30 | 34 | 34 | 30 | 39 | 39 | 39 | 39 |
| Thixo agent | Ester-based thixo agent | Hardened castor oil | 5 | 5 | 5 | 5 | 5 | | | | |
| | Amide-based thixo agent | Polyamide-based thixo agent | | | | | | | 5 | | |
| | | Bisamide-based thixo agent | | | | | | | | 5 | |
| | | Amide-based thixo agent | | | | | | | | | 5 |
| | | Total amount | 100 | 100 | 100 | 100 | 100 | 100 | 100 | 100 | 100 |
| Evaluation | | Spreadability | A | A | A | A | A | A | A | A | A |

| | | | Example | | | Comparative Example | |
|---|---|---|---|---|---|---|---|
| Material Category | | Material kind | D24 | D25 | D26 | D1 | D2 |
| Resin | Rosin | Polymerized rosin | 25 | 40 | 5 | 45 | 45 |
| | | Hydrogenated rosin | | | | | |
| | | Acid-modified rosin | | | | | |
| | Other resin | Acrylic resin | 10 | 5 | 20 | | |
| | | Acrylic polyethylene copolymer resin | 10 | | 10 | | |
| Activator | Organic acid | Glutaric acid | | | | 5 | |
| | | Adipic acid | | | 5 | | 5 |
| | | Hydrogenated dimer acid | | | 5 | | |
| | (Carboxyalkyl) isocyanurate adduct | Bis(2-carboxyethyl) isocyanurate | 5 | 5 | 5 | | |
| | Amine | Monoethanolamine | 5 | 5 | 5 | 5 | 5 |
| | | Diphenylguanidine | | | | | |
| | | 2-Phenylimidazole | | | | | |
| | | 2-Phenyl-4-methylimidazole | | | | | |
| | Organic halogen compound | Trans-2,3- dibromo-1,4-butenediol | 1 | 1 | 1 | 1 | 1 |
| | | Triallyl isocyanurate hexabromide | | | | | |
| | Amine halogenated hydroacid salt | Aniline•HCl | | | | | |
| | | Aniline•HBr | | | | | |
| Solvent | Solvent | Hexyl diglycol | 39 | 39 | 39 | 39 | 39 |
| Thixo agent | Ester-based thixo agent | Hardened castor oil | 5 | 5 | 5 | 5 | 5 |
| | Amide-based thixo agent | Polyamide-based thixo agent | | | | | |
| | | Bisamide-based thixo agent | | | | | |
| | | Amide-based thixo agent | | | | | |
| | | Total amount | 100 | 100 | 100 | 100 | 100 |
| Evaluation | | Spreadability | A | A | A | B | B |

TABLE 9

| | | | Example | | | | | | | | |
|---|---|---|---|---|---|---|---|---|---|---|---|
| Material Category | | Material kind | E1 | E2 | E3 | E4 | E5 | E6 | E7 | E8 | E9 |
| Resin | Rosin | Polymerized rosin | 45 | 45 | 45 | 45 | 45 | 45 | 45 | 45 | 45 |
| | | Hydrogenated rosin | | | | | | | | | |
| | | Acid-modified rosin | | | | | | | | | |
| | Other resin | Acrylic resin | | | | | | | | | |
| | | Acrylic polyethylene copolymer resin | | | | | | | | | |
| Activator | Organic acid | Glutaric acid | | | | | | | | | |
| | | Adipic acid | | | | | | | | | |
| | | Hydrogenated dimer acid | | | | | | | | | |
| | (Carboxyalkyl) isocyanurate adduct | Tris(2-carboxyethyl) isocyanurate | 1.25 | 2.5 | 2.5 | 2.5 | | | | 2.5 | 2.5 |
| | | Tris(1-carboxymethyl) isocyanurate | 1.25 | 2.5 | | 2.5 | 2.5 | 2.5 | | 2.5 | 2.5 |

TABLE 9-continued

| Material Category | | Material kind | | | | | | | | | |
|---|---|---|---|---|---|---|---|---|---|---|---|
| | | Tris(3-carboxypropyl) isocyanurate | 1.25 | 2.5 | 2.5 | | 2.5 | 2.5 | | | |
| | | Bis(2-carboxyethyl) isocyanurate | 1.25 | | 2.5 | 2.5 | 2.5 | | 2.5 | | |
| | Amine | Monoethanolamine | 5 | 5 | 5 | 5 | 5 | 5 | 5 | 3 | 3 |
| | | Diphenylguanidine | | | | | | | | | |
| | | 2-Phenylimidazole | | | | | | | | | |
| | | 2-Phenyl-4-methylimidazole | | | | | | | | | |
| | Organic halogen compound | Trans-2,3-dibromo-1,4-butenediol | 1 | 1 | 1 | 1 | 1 | 1 | 1 | 1 | 1 |
| | | Triallyl isocyanurate hexabromide | | | | | | | | | |
| | Amine halogenated hydroacid salt | Aniline•HCl | | | | | | | | | |
| | | Aniline•HBr | | | | | | | | | |
| Solvent | Solvent | Hexyl diglycol | 39 | 39 | 39 | 39 | 39 | 39 | 39 | 38.5 | 38.5 |
| Thixo agent | Ester-based thixo agent | Hardened castor oil | 5 | 5 | 5 | 5 | 5 | 5 | 5 | 5 | 5 |
| | Amide-based thixo agent | Polyamide-based thixo agent | | | | | | | | | |
| | | Bisamide-based thixo agent | | | | | | | | | |
| | | Amide-based thixo agent | | | | | | | | | |
| | | Total amount | 100 | 100 | 100 | 100 | 100 | 100 | 100 | 100 | 100 |
| Evaluation | | Spreadability | A | A | A | A | A | A | A | A | A |

| | | | Example | | | | Comparative Example | |
|---|---|---|---|---|---|---|---|---|
| Material Category | | Material kind | E10 | E11 | E12 | E13 | E1 | E2 |
| Resin | Rosin | Polymerized rosin | 45 | 45 | 5 | 5 | 45 | 45 |
| | | Hydrogenated rosin | | | 10 | | | |
| | | Acid-modified rosin | | | 15 | | | |
| | Other resin | Acrylic resin | | | | 20 | | |
| | | Acrylic polyethylene copolymer resin | | | | 10 | | |
| Activator | Organic acid | Glutaric acid | | | | | 5 | |
| | | Adipic acid | | | 5 | 5 | | 5 |
| | | Hydrogenated dimer acid | | | 10 | 5 | | |
| | (Carboxyalkyl) isocyanurate adduct | Tris(2-carboxyethyl) isocyanurate | 2.5 | | 1.25 | 1.25 | | |
| | | Tris(1-carboxymethyl) isocyanurate | | 2.5 | 1.25 | 1.25 | | |
| | | Tris(3-carboxypropyl) isocyanurate | 2.5 | 2.5 | 1.25 | 1.25 | | |
| | | Bis(2-carboxyethyl) isocyanurate | 2.5 | 2.5 | 1.25 | 1.25 | | |
| | Amine | Monoethanolamine | 3 | 3 | | | 5 | 5 |
| | | Diphenylguanidine | | | | 1 | | |
| | | 2-Phenylimidazole | | | 5 | | | |
| | | 2-Phenyl-4-methylimidazole | | | | 4 | | |
| | Organic halogen compound | Trans-2,3-dibromo-1,4-butenediol | 1 | 1 | 1 | 1 | 1 | 1 |
| | | Triallyl isocyanurate hexabromide | | | | | | |
| | Amine halogenated hydroacid salt | Aniline•HCl | | | | | | |
| | | Aniline•HBr | | | | | | |
| Solvent | Solvent | Hexyl diglycol | 38.5 | 38.5 | 39 | 39 | 39 | 39 |
| Thixo agent | Ester-based thixo agent | Hardened castor oil | 5 | 5 | 5 | 5 | 5 | 5 |
| | Amide-based thixo agent | Polyamide-based thixo agent | | | | | | |
| | | Bisamide-based thixo agent | | | | | | |
| | | Amide-based thixo agent | | | | | | |
| | | Total amount | 100 | 100 | 100 | 100 | 100 | 100 |
| Evaluation | | Spreadability | A | A | A | A | B | B |

Tables 1 and 2 show examples in which a tris(2-carboxyethyl)isocyanurate was contained as a (carboxyalkyl)isocyanurate adduct, and comparative examples in which neither a tris(2-carboxyethyl)isocyanurate nor other (carboxyalkyl)isocyanurate adducts were contained. Tables 3 and 4 show examples in which a tris(1-carboxymethyl)isocyanurate was contained as a (carboxyalkyl)isocyanurate adduct, and comparative examples in which neither tris(1-carboxymethyl)isocyanurate nor other (carboxyalkyl)isocyanurate adducts were contained. Tables 5 and 6 show examples in which a tris(3-carboxypropyl)isocyanurate was contained as a (carboxyalkyl)isocyanurate adduct and comparative examples in which neither tris(3-carboxypropyl)isocyanurate nor other (carboxyalkyl)isocyanurate adducts were contained. Tables 7 and 8 show examples in which a bis(2-carboxyethyl)isocyanurate was contained as a (carboxyalkyl)isocyanurate adduct and comparative examples in which neither bis(2-carboxyethyl)isocyanurate nor other (carboxyalkyl)isocyanurate adducts were contained.

In Examples A1 to A3, B1 to B3, C1 to C3, and D1 to D3, the kind of rosin was changed. In Example A1, 5.0% by mass of the tris(2-carboxyethyl)isocyanurate was contained within the range defined in the present disclosure. In Example B1, 5.0% by mass of the tris(1-carboxymethyl)isocyanurate was contained within the range defined in the present disclosure. In Example C1, 5.0% by mass of the tris(3-carboxypropyl)isocyanurate was contained within the range defined in the present disclosure. In Example D1, 5.0% by mass of the bis(2-carboxyethyl)isocyanurate was contained within the range defined in the present disclosure. In Examples A1, B1, C1, and D1, 45.0% by mass of a polymerized rosin as a rosin was contained within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of hexyl diglycol as a solvent was contained as a balance thereof, within the range defined in the present disclosure.

In Examples A1, B1, C1 and D1, the wet-spread diameter of solder satisfied the above-described evaluation criteria, and thus a sufficient effect was obtained in terms of the solder spreadability.

In Example A2, 5.0% by mass of a tris(2-carboxyethyl)isocyanurate was contained within the range defined in the present disclosure. In Example B2, 5.0% by mass of a tris(1-carboxymethyl)isocyanurate was contained within the range defined in the present disclosure. In Example C2, 5.0% by mass of a tris(3-carboxypropyl)isocyanurate was contained within the range defined in the present disclosure. In Example D2, 5.0% by mass of a bis(2-carboxyethyl)isocyanurate was contained within the range defined in the present disclosure. In Examples A2, B2, C2, and D2, 45.0% by mass of a hydrogenated rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of hexyl diglycol as a solvent was contained as a balance thereof, within the range defined in the present disclosure.

In Examples A2, B2, C2, and D2, the wet-spread diameter of solder satisfied the above-described evaluation criteria, and thus a sufficient effect was obtained in terms of the solder spreadability.

In Example A3, 5.0% by mass of a tris(2-carboxyethyl)isocyanurate was contained within the range defined in the present disclosure. In Example B3, 5.0% by mass of a tris(1-carboxymethyl)isocyanurate was contained within the range defined in the present disclosure. In Example C3, 5.0% by mass of a tris(3-carboxypropyl)isocyanurate was contained within the range defined in the present disclosure. In Example D3, 5.0% by mass of a bis(2-carboxyethyl)isocyanurate was contained within the range defined in the present disclosure. In Examples A3, B3, C3, and D3, 45.0% by mass of an acid-modified rosin was contained as a rosin within the range defined in the present disclosure. 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of hexyl diglycol as a solvent was contained as a balance thereof, within the range defined in the present disclosure.

In Examples A3, B3, C3, and D3, the wet-spread diameter of solder satisfied the above-described evaluation criteria, and thus a sufficient effect was obtained in terms of the solder spreadability.

In Examples A4, B4, C4, and D4, plural rosins were formulated. In Example A4, 5.0% by mass of a tris(2-carboxyethyl)isocyanurate was contained within the range defined in the present disclosure. In Example B4, 5.0% by mass of a tris(1-carboxymethyl)isocyanurate was contained within the range defined in the present disclosure. In Example C4, 5.0% by mass of a tris(3-carboxypropyl)isocyanurate was contained within the range defined in the present disclosure. In Example D4, 5.0% by mass of a bis(2-carboxyethyl)isocyanurate was contained within the range defined in the present disclosure. In Examples A4, B4, C4, and D4, 25.0% by mass of a polymerized rosin, and 20% by mass of an acid-modified rosin were contained as rosins within the range defined in the present disclosure. The total amount of the rosins was within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of hexyl diglycol as a solvent was contained as a balance thereof, within the range defined in the present disclosure.

In Examples A4, B4, C4, and D4, the wet-spread diameter of solder satisfied the above-described evaluation criteria, and thus a sufficient effect was obtained in terms of the solder spreadability.

In Examples A5 to A8, B5 to B8, C5 to C8, and D5 to D8, the amount of amine was changed. In Example A5, 20.0% by mass of a tris(2-carboxyethyl)isocyanurate was contained within the range defined in the present disclosure. In Example B5, 20.0% by mass of a tris(1-carboxymethyl)isocyanurate was contained within the range defined in the present disclosure. In Example C5, 20.0% by mass of a tris(3-carboxypropyl)isocyanurate was contained within the range defined in the present disclosure. In Example D5, 20.0% by mass of a bis(2-carboxyethyl)isocyanurate was contained within the range defined in the present disclosure. In Examples A5, B5, C5, and D5, 45.0% by mass of a polymerized rosin was contained as a rosin within the range defined in the present disclosure. No amine was contained, and 1.0% by mass of a trans-2,3-dibromo-1,4-butenediol as an organic halogen compound, and 5% by mass of a hardened castor oil as a thixo agent were contained within the range defined in the present disclosure, and 29.0% by mass of hexyl diglycol as a solvent was contained as a balance thereof, within the range defined in the present disclosure.

In Examples A5, B5, C5, and D5, although no amine was contained, the increase in the amount of the (carboxyalkyl) isocyanurate adduct allowed the wet-spread diameter of solder to satisfy the above-described evaluation criteria, and thus to exhibit a sufficient effect in terms of the solder spreadability.

In Example A6, 20.0% by mass of a tris(2-carboxyethyl)isocyanurate was contained within the range defined in the present disclosure. In Example B6, 20.0% by mass of a tris(1-carboxymethyl)isocyanurate was contained within the range defined in the present disclosure. In Example C6, 20.0% by mass of a tris(3-carboxypropyl)isocyanurate was contained within the range defined in the present disclosure. In Example D6, 20.0% by mass of a bis(2-carboxyethyl)isocyanurate was contained within the range defined in the present disclosure. In Examples A6, B6, C6, and D6, 45.0% by mass of a polymerized rosin was contained as a rosin within the range defined in the present disclosure. In addition, 0.1% by mass of a monoethanolamine as an amine, 1.0% by mass of a trans-2,3-dibromo-1,4-butenediol as an organic halogen compound, and 5% by mass of a hardened castor oil as a thixo agent were contained, and 28.9% by mass of a hexyl diglycol as a solvent was contained as a balance thereof, within the range defined in the present disclosure.

In Examples A6, B6, C6, and D6, the wet-spread diameter of solder satisfied the above-described evaluation criteria, and thus a sufficient effect was obtained in terms of the solder spreadability.

In Example A7, 20.0% by mass of a tris(2-carboxyethyl) isocyanurate was contained within the range defined in the present disclosure. In Example B7, 20.0% by mass of a tris(1-carboxymethyl)isocyanurate was contained within the range defined in the present disclosure. In Example C7, 20.0% by mass of a tris(3-carboxypropyl)isocyanurate was contained within the range defined in the present disclosure. In Example D7, 20.0% by mass of a bis(2-carboxyethyl) isocyanurate was contained within the range defined in the present disclosure. In Examples A7, B7, C7, and D7, 45.0% by mass of a polymerized rosin was contained as a rosin within the range defined in the present disclosure. In addition, 0.5% by mass of a monoethanolamine as an amine, 1.0% by mass of a trans-2,3-dibromo-1,4-butenediol as an organic halogen compound, and 5% by mass of a hardened castor oil as a thixo agent were contained, and 28.5% by mass of a hexyl diglycol as a solvent was contained as a balance thereof, within the range defined in the present disclosure.

In Examples A7, B7, C7, and D7, the wet-spread diameter of solder satisfied the above-described evaluation criteria, and thus a sufficient effect was obtained in terms of the solder spreadability.

In Example A8, 5.0% by mass of a tris(2-carboxyethyl) isocyanurate was contained within the range defined in the present disclosure. In Example B8, 5.0% by mass of a tris(1-carboxymethyl)isocyanurate was contained within the range defined in the present disclosure. In Example C8, 5.0% by mass of a tris(3-carboxypropyl)isocyanurate was contained within the range defined in the present disclosure. In Example D8, 5.0% by mass of a bis(2-carboxyethyl) isocyanurate was contained within the range defined in the present disclosure. In Examples A8, B8, C8, and D8, 45.0% by mass of a polymerized rosin was contained as a rosin within the range defined in the present disclosure. In addition, 10.0% by mass of a monoethanolamine as an amine, 1.0% by mass of a trans-2,3-dibromo-1,4-butenediol as an organic halogen compound, and 5% by mass of a hardened castor oil as a thixo agent were contained, and 34.0% by mass of a hexyl diglycol as a solvent was contained as a balance thereof, within the range defined in the present disclosure.

In Examples A8, B8, C8, and D8, the wet-spread diameter of solder satisfied the above-described evaluation criteria, and thus a sufficient effect was obtained in terms of the solder spreadability.

In Examples A9, B9, C9, and D9, another organic acid different from (carboxyalkyl)isocyanurate adducts was contained. In Example A9, 0.5% by mass of a tris(2-carboxyethyl)isocyanurate was contained within the range defined in the present disclosure. In Example B9, 0.5% by mass of a tris(1-carboxymethyl)isocyanurate was contained within the range defined in the present disclosure. In Example C9, 0.5% by mass of a tris(3-carboxypropyl)isocyanurate was contained within the range defined in the present disclosure. In Example D9, 0.5% by mass of a bis(2-carboxyethyl) isocyanurate was contained within the range defined in the present disclosure. In Examples A9, B9, C9, and D9, 45.0% by mass of a polymerized rosin was contained as a rosin within the range defined in the present disclosure. In addition, 5.0% by mass of a glutaric acid as an organic acid, 10.0% by mass of a monoethanolamine as an amine, 1.0% by mass of a trans-2,3-dibromo-1,4-butenediol as an organic halogen compound, and 5% by mass of a hardened castor oil as a thixo agent were contained, and 33.5% by mass of a hexyl diglycol as a solvent was contained as a balance thereof, within the range defined in the present disclosure.

In Examples A9, B9, C9, and D9, although the amount of the (carboxyalkyl)isocyanurate adduct was decreased within the range defined in the present disclosure, the presence of another organic acid different from the (carboxyalkyl)isocyanurate adducts allowed the wet-spread diameter of solder to satisfy the above-described evaluation criteria, and to realize a sufficient effect in terms of the solder spreadability.

In Examples A10 to A12, B10 to B12, C10 to C12, and D10 to D12, another organic acid different from the (carboxyalkyl)isocyanurate adducts was contained, and the type of amine was changed. In Example A10, 5.0% by mass of a tris(2-carboxyethyl)isocyanurate was contained within the range defined in the present disclosure. In Example B10, 5.0% by mass of a tris(1-carboxymethyl)isocyanurate was contained within the range defined in the present disclosure. In Example C10, 5.0% by mass of a tris(3-carboxypropyl) isocyanurate was contained within the range defined in the present disclosure. In Example D10, 5.0% by mass of a bis(2-carboxyethyl)isocyanurate was contained within the range defined in the present disclosure. In Examples A10, B10, C10, and D10, 45.0% by mass of a polymerized rosin was contained as a rosin within the range defined in the present disclosure. In addition, 5.0% by mass of a glutaric acid as an organic acid, 2.0% by mass of a diphenylguanidine as an amine, 1.0% by mass of a trans-2,3-dibromo-1,4-butenediol as an organic halogen compound, and 5% by mass of a hardened castor oil as a thixo agent were contained, and 37.0% by mass of a hexyl diglycol as a solvent was contained as a balance thereof, within the range defined in the present disclosure.

In Examples A10, B10, C10, and D10, the wet-spread diameter of solder satisfied the above-described evaluation criteria, and thus a sufficient effect was obtained in terms of the solder spreadability.

In Example A11, 5.0% by mass of a tris(2-carboxyethyl) isocyanurate was contained within the range defined in the present disclosure. In Example B11, 5.0% by mass of a tris(1-carboxymethyl)isocyanurate was contained within the range defined in the present disclosure. In Example C11, 5.0% by mass of a tris(3-carboxypropyl)isocyanurate was contained within the range defined in the present disclosure. In Example D11, 5.0% by mass of a bis(2-carboxyethyl) isocyanurate was contained within the range defined in the present disclosure. In Examples A11, B11, C11, and D11, 45.0% by mass of a polymerized rosin was contained as a rosin within the range defined in the present disclosure. In addition, 5.0% by mass of a glutaric acid as an organic acid, 2.0% by mass of a 2-phenylimidazole as an amine, 1.0% by mass of a trans-2,3-dibromo-1,4-butenediol as an organic halogen compound, and 5% by mass of a hardened castor oil as a thixo agent were contained, and 37.0% by mass of a hexyl diglycol as a solvent was contained as a balance thereof, within the range defined in the present disclosure.

In Examples A11, B11, C11, and D11, the wet-spread diameter of solder satisfied the above-described evaluation criteria, and thus a sufficient effect was obtained in terms of the solder spreadability.

In Example A12, 5.0% by mass of a tris(2-carboxyethyl)isocyanurate was contained within the range defined in the present disclosure. In Example B12, 5.0% by mass of a tris(1-carboxymethyl)isocyanurate was contained within the range defined in the present disclosure. In Example C12, 5.0% by mass of a tris(3-carboxypropyl)isocyanurate was contained within the range defined in the present disclosure. In Example D12, 5.0% by mass of a bis(2-carboxyethyl)isocyanurate was contained within the range defined in the present disclosure. In Examples A12, B12, C12, and D12, 45.0% by mass of a polymerized rosin was contained as a rosin within the range defined in the present disclosure. In addition, 5.0% by mass of a glutaric acid as an organic acid, 2.0% by mass of a 2-phenyl-4-methylimidazole as an amine, 1.0% by mass of a trans-2,3-dibromo-1,4-butenediol as an organic halogen compound, and 5% by mass of a hardened castor oil as a thixo agent were contained, and 37.0% by mass of a hexyl diglycol as a solvent was contained as a balance thereof, within the range defined in the present disclosure.

In Examples A12, B12, C12, and D12, the wet-spread diameter of solder satisfied the above-described evaluation criteria, and thus a sufficient effect was obtained in terms of the solder spreadability.

In Examples A13, B13, C13, and D13, the amount of another organic acid different from the (carboxyalkyl)isocyanurate adducts was changed. In Example A13, 5.0% by mass of a tris(2-carboxyethyl)isocyanurate was contained within the range defined in the present disclosure. In Example B13, 5.0% by mass of a tris(1-carboxymethyl)isocyanurate was contained within the range defined in the present disclosure. In Example C13, 5.0% by mass of a tris(3-carboxypropyl)isocyanurate was contained within the range defined in the present disclosure. In Example D13, 5.0% by mass of a bis(2-carboxyethyl)isocyanurate was contained within the range defined in the present disclosure. In Examples A13, B13, C13, and D13, 45.0% by mass of a polymerized rosin was contained as a rosin within the range defined in the present disclosure. In addition, 10.0% by mass of a glutaric acid as an organic acid was contained within the range defined in the present disclosure, no amine was contained, 1.0% by mass of a trans-2,3-dibromo-1,4-butenediol as an organic halogen compound, and 5% by mass of a hardened castor oil as a thixo agent were contained within the range defined in the present disclosure, and 34.0% by mass of a hexyl diglycol as a solvent was contained as a balance thereof within the range defined in the present disclosure.

In Examples A13, B13, C13, and D13, although no amine was contained, the increase in the amount of another organic acid different from the (carboxyalkyl)isocyanurate adducts within the range defined in the present disclosure allowed the wet-spread diameter of solder to satisfy the above-described evaluation criteria, and thus to realize a sufficient effect in terms of the solder spreadability.

In Examples A14, B14, C14, and D14, the amount of another organic acid different from the (carboxyalkyl)isocyanurate adducts was changed. In Example A14, 5.0% by mass of a tris(2-carboxyethyl)isocyanurate was contained within the range defined in the present disclosure. In Example B14, 5.0% by mass of a tris(1-carboxymethyl)isocyanurate was contained within the range defined in the present disclosure. In Example C14, 5.0% by mass of a tris(3-carboxypropyl)isocyanurate was contained within the range defined in the present disclosure. In Example D14, 5.0% by mass of a bis(2-carboxyethyl)isocyanurate was contained within the range defined in the present disclosure.

In Examples A14, B14, C14, and D14, 45.0% by mass of a polymerized rosin was contained as a rosin within the range defined in the present disclosure. In addition, 5.0% by mass of an adipic acid as an organic acid was contained within the range defined in the present disclosure, no amine was contained, 1.0% by mass of a trans-2,3-dibromo-1,4-butenediol as an organic halogen compound, and 5% by mass of a hardened castor oil as a thixo agent were contained within the range defined in the present disclosure, and 39.0% by mass of a hexyl diglycol as a solvent was contained as a balance thereof within the range defined in the present disclosure.

In Examples A14, B14, C14, and D14, although no amine was contained, the change in the type of another organic acid different from the (carboxyalkyl)isocyanurate adducts allowed the wet-spread diameter of solder to satisfy the above-described evaluation criteria, and thus to realize a sufficient effect in terms of the solder spreadability.

In Examples A15, A16, B15, B16, C15, C16, D15 and D16, another organic acid different from the (carboxyalkyl)isocyanurate adducts was contained, and the amount of an organic halogen compound was changed. In Example A15, 5.0% by mass of a tris(2-carboxyethyl)isocyanurate was contained within the range defined in the present disclosure. In Example B15, 5.0% by mass of a tris(1-carboxymethyl)isocyanurate was contained within the range defined in the present disclosure. In Example C15, 5.0% by mass of a tris(3-carboxypropyl)isocyanurate was contained within the range defined in the present disclosure. In Example D15, 5.0% by mass of a bis(2-carboxyethyl)isocyanurate was contained within the range defined in the present disclosure. In Examples A15, B15, C15, and D15, 45.0% by mass of a polymerized rosin was contained as a rosin within the range defined in the present disclosure. In addition, 5.0% by mass of a glutaric acid as an organic acid and 5.0% by mass of a monoethanolamine as an amine were contained, no organic halogen compound was contained, and 5% by mass of a hardened castor oil as a thixo agent was contained, and 35.0% by mass of a hexyl diglycol as a solvent was contained as a balance thereof, within the range defined in the present disclosure.

In Examples A15, B15, C15, and D15, although no organic halogen compound was contained, the presence of another organic acid different from the (carboxyalkyl)isocyanurate adducts and an amine within the range defined in the present disclosure allowed the wet-spread diameter of solder to satisfy the above-described evaluation criteria, and thus to realize a sufficient effect in terms of the solder spreadability.

In Example A16, 5.0% by mass of a tris(2-carboxyethyl)isocyanurate was contained within the range defined in the present disclosure. In Example B16, 5.0% by mass of a tris(1-carboxymethyl)isocyanurate was contained within the range defined in the present disclosure. In Example C16, 5.0% by mass of a tris(3-carboxypropyl)isocyanurate was contained within the range defined in the present disclosure. In Example D16, 5.0% by mass of a bis(2-carboxyethyl)isocyanurate was contained within the range defined in the present disclosure. In Examples A16, B16, C16, and D16, 45.0% by mass of a polymerized rosin was contained as a rosin within the range defined in the present disclosure. In addition, 5.0% by mass of a glutaric acid as an organic acid, 5.0% by mass of a monoethanolamine as an amine, 5.0% by mass of a trans-2,3-dibromo-1,4-butenediol as an organic halogen compound, and 5% by mass of a hardened castor oil as a thixo agent were contained within the range defined in the present disclosure, and 30.0% by mass of a hexyl diglycol as a solvent was contained as a balance thereof, within the range defined in the present disclosure.

In Examples A16, B16, C16, and D16, the presence of another organic acid different from the (carboxyalkyl)isocyanurate adducts, the amine, and the organic halogen compound within the range defined in the present disclosure allowed the wet-spread diameter of solder to satisfy the above-described evaluation criteria, and thus to realize a sufficient effect in terms of the solder spreadability.

In Examples A17, B17, C17, and D17, another organic acid different from the (carboxyalkyl)isocyanurate adducts was contained and the type of an organic halogen compound was changed. In Example A17, 5.0% by mass of a tris(2-carboxyethyl)isocyanurate was contained within the range defined in the present disclosure. In Example B17, 5.0% by mass of a tris(1-carboxymethyl)isocyanurate was contained within the range defined in the present disclosure. In Example C17, 5.0% by mass of a tris(3-carboxypropyl)isocyanurate was contained within the range defined in the present disclosure. In Example D17, 5.0% by mass of a bis(2-carboxyethyl)isocyanurate was contained within the range defined in the present disclosure. In Examples A17, B17, C17, and D17, 45.0% by mass of a polymerized rosin was contained as a rosin within the range defined in the present disclosure. In addition, 5.0% by mass of a glutaric acid as an organic acid, 5.0% by mass of a monoethanolamine as an amine, 1.0% by mass of a triallyl isocyanurate hexabromide as an organic halogen compound, and 5% by mass of a hardened castor oil as a thixo agent were contained, and 34.0% by mass of a hexyl diglycol as a solvent was contained as a balance thereof, within the range defined in the present disclosure.

In Examples A17, B17, C17, and D17, the wet-spread diameter of solder satisfied the above-described evaluation criteria, and thus a sufficient effect was obtained in terms of the solder spreadability.

In Examples A18, B18, C18, and D18, another organic acid different from the (carboxyalkyl)isocyanurate adducts, and an amine halogenated hydroacid salt were contained. In Example A18, 5.0% by mass of a tris(2-carboxyethyl) isocyanurate was contained within the range defined in the present disclosure. In Example B18, 5.0% by mass of a tris(1-carboxymethyl)isocyanurate was contained within the range defined in the present disclosure. In Example C18, 5.0% by mass of a tris(3-carboxypropyl)isocyanurate was contained within the range defined in the present disclosure. In Example D18, 5.0% by mass of a bis(2-carboxyethyl) isocyanurate was contained within the range defined in the present disclosure. In Examples A18, B18, C18, and D18, 45.0% by mass of a polymerized rosin was contained as a rosin within the range defined in the present disclosure. In addition, 5.0% by mass of a glutaric acid as an organic acid, 5.0% by mass of a monoethanolamine as an amine, 1.0% by mass of an aniline HCl as an amine halogenated hydroacid salt, and 5% by mass of a hardened castor oil as a thixo agent were contained, and 34.0% by mass of a hexyl diglycol as a solvent was contained as a balance thereof, within the range defined in the present disclosure.

In Examples A18, B18, C18, and D18, the wet-spread diameter of solder satisfied the above-described evaluation criteria, and thus a sufficient effect was obtained in terms of the solder spreadability.

In Examples A19, B19, C19, and D19, another organic acid different from the (carboxyalkyl)isocyanurate adducts was contained, and the type of amine halogenated hydroacid salt was changed. In Example A19, 5.0% by mass of a tris(2-carboxyethyl)isocyanurate was contained within the range defined in the present disclosure. In Example B19, 5.0% by mass of a tris(1-carboxymethyl)isocyanurate was contained within the range defined in the present disclosure. In Example C19, 5.0% by mass of a tris(3-carboxypropyl) isocyanurate was contained within the range defined in the present disclosure. In Example D19, 5.0% by mass of a bis(2-carboxyethyl)isocyanurate was contained within the range defined in the present disclosure. In Examples A19, B19, C19, and D19, 45.0% by mass of a polymerized rosin was contained as a rosin within the range defined in the present disclosure. In addition, 5.0% by mass of a glutaric acid as an organic acid, 5.0% by mass of a monoethanolamine as an amine, 5.0% by mass of an aniline HBr as an amine halogenated hydroacid salt, and 5% by mass of a hardened castor oil as a thixo agent were contained, and 30.0% by mass of a hexyl diglycol as a solvent was contained as a balance thereof, within the range defined in the present disclosure.

In Examples A19, B19, C19, and D19, the wet-spread diameter of solder satisfied the above-described evaluation criteria, and thus a sufficient effect was obtained in terms of the solder spreadability.

In Examples A20 to A23, B20 to B23, C20 to C23, and D20 to D23, the amount and the type of thixo agent were changed. In Example A20, 5.0% by mass of a tris(2-carboxyethyl)isocyanurate was contained within the range defined in the present disclosure. In Example B20, 5.0% by mass of a tris(1-carboxymethyl)isocyanurate was contained within the range defined in the present disclosure. In Example C20, 5.0% by mass of a tris(3-carboxypropyl) isocyanurate was contained within the range defined in the present disclosure. In Example D20, 5.0% by mass of a bis(2-carboxyethyl)isocyanurate was contained within the range defined in the present disclosure. In Examples A20, B20, C20, and D20, 45.0% by mass of a polymerized rosin, and 5% by mass of an acid-modified rosin were contained as rosins within the range defined in the present disclosure. The total amount of the rosins was within the range defined in the present disclosure. In addition, 5.0% by mass of a monoethanolamine as an amine, and 1.0% by mass of a trans-2,3-dibromo-1,4-butenediol as an organic halogen compound were contained within the range defined in the present disclosure, no thixo agent was contained, and 39.0% by mass of a hexyl diglycol as a solvent was contained as a balance thereof, within the range defined in the present disclosure.

In Examples A20, B20, C20, and D20, the wet-spread diameter of solder satisfied the above-described evaluation criteria, and thus a sufficient effect was obtained in terms of the solder spreadability.

In Example A21, 5.0% by mass of a tris(2-carboxyethyl) isocyanurate was contained within the range defined in the present disclosure. In Example B21, 5.0% by mass of a tris(1-carboxymethyl)isocyanurate was contained within the range defined in the present disclosure. In Example C21, 5.0% by mass of a tris(3-carboxypropyl)isocyanurate was contained within the range defined in the present disclosure. In Example D21, 5.0% by mass of a bis(2-carboxyethyl) isocyanurate was contained within the range defined in the present disclosure. In Examples A21, B21, C21, and D21, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5.0% by mass of a polyamide-based thixo agent as a thixo agent were contained, and 39.0% by mass of a hexyl diglycol as a solvent was contained as a balance thereof, within the range defined in the present disclosure.

In Examples A21, B21, C21, and D21, the wet-spread diameter of solder satisfied the above-described evaluation criteria, and thus a sufficient effect was obtained in terms of the solder spreadability.

In Example A22, 5.0% by mass of a tris(2-carboxyethyl) isocyanurate was contained within the range defined in the present disclosure. In Example B22, 5.0% by mass of a tris(1-carboxymethyl)isocyanurate was contained within the range defined in the present disclosure. In Example C22, 5.0% by mass of a tris(3-carboxypropyl)isocyanurate was contained within the range defined in the present disclosure. In Example D22, 5.0% by mass of a bis(2-carboxyethyl) isocyanurate was contained within the range defined in the present disclosure. In Examples A22, B22, C22, and D22, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5.0% by mass of a bis-amide-based thixo agent as a thixo agent were contained, and of 39.0% by mass of a hexyl diglycol as a solvent was contained as a balance thereof within the range defined in the present disclosure.

In Examples A22, B22, C22, and D22, the wet-spread diameter of solder satisfied the above-described evaluation criteria, and thus a sufficient effect was obtained in terms of the solder spreadability.

In Example A23, 5.0% by mass of a tris(2-carboxyethyl) isocyanurate was contained within the range defined in the present disclosure. In Example B23, 5.0% by mass of a tris(1-carboxymethyl)isocyanurate was contained within the range defined in the present disclosure. In Example C23, 5.0% by mass of a tris(3-carboxypropyl)isocyanurate was contained within the range defined in the present disclosure. In Example D23, 5.0% by mass of a bis(2-carboxyethyl) isocyanurate was contained within the range defined in the present disclosure. In Examples A23, B23, C23, and D23, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5.0% by mass of an amide-based thixo agent as a thixo agent were contained, and 39.0% by mass of a hexyl diglycol as a solvent was contained as a balance thereof, within the range defined in the present disclosure.

In Examples A23, B23, C23, and D23, the wet-spread diameter of solder satisfied the above-described evaluation criteria, and thus a sufficient effect was obtained in terms of the solder spreadability.

In Examples A24 to A26, B24 to B26, C24 to C26, and D24 to D26, (an)other resin(s) was(were) contained. In Example A24, 5.0% by mass of a tris(2-carboxyethyl) isocyanurate was contained within the range defined in the present disclosure. In Example B24, 5.0% by mass of a tris(1-carboxymethyl)isocyanurate was contained within the range defined in the present disclosure. In Example C24, 5.0% by mass of a tris(3-carboxypropyl)isocyanurate was contained within the range defined in the present disclosure. In Example D24, 5.0% by mass of a bis(2-carboxyethyl) isocyanurate was contained within the range defined in the present disclosure. In Examples A24, B24, C24, and D24, 25.0% by mass of a polymerized rosin was contained as a rosin, and 10.0% by mass of an acrylic resin and 10.0% by mass of an acrylic polyethylene copolymer resin were contained as additional resins, within the range defined in the present disclosure. The total amount of the additional resins was within the range defined in the present disclosure, and the ratio of the acrylic resin to the rosin (acrylic resin/rosin) was 0.8, which was within the range defined in the present disclosure. In addition, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained, and 39.0% by mass of hexyl diglycol as a solvent was contained as a balance thereof, within the range defined in the present disclosure.

In Examples A24, B24, C24, and D24, the presence of the acrylic resin as an additional resin allowed the wet-spread diameter of solder to satisfy the above-described evaluation criteria, and thus to realize a sufficient effect in terms of the solder spreadability.

In Example A25, 5.0% by mass of a tris(2-carboxyethyl) isocyanurate was contained within the range defined in the present disclosure. In Example B25, 5.0% by mass of a tris(1-carboxymethyl)isocyanurate was contained within the range defined in the present disclosure. In Example C25, 5.0% by mass of a tris(3-carboxypropyl)isocyanurate was contained within the range defined in the present disclosure. In Example D25, 5.0% by mass of a bis(2-carboxyethyl) isocyanurate was contained within the range defined in the present disclosure. In Examples A25, B25, C25, and D25, 40.0% by mass of a polymerized rosin as a rosin, and 5.0% by mass of an acrylic resin were contained within the range defined in the present disclosure. The ratio of the acrylic resin to the rosin (acrylic resin/rosin) was 0.125, which was within the range defined in the present disclosure. In addition, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained within the range defined in the present disclosure, and 39.0% by mass of hexyl diglycol as a solvent was contained as a balance thereof, within the range defined in the present disclosure.

In Examples A25, B25, C25, and D25, the wet-spread diameter of solder satisfied the above-described evaluation criteria, and thus a sufficient effect was obtained in terms of the solder spreadability.

In Example A26, 5.0% by mass of a tris(2-carboxyethyl) isocyanurate was contained within the range defined in the present disclosure. In Example B26, 5.0% by mass of a tris(1-carboxymethyl)isocyanurate was contained within the range defined in the present disclosure. In Example C26, 5.0% by mass of a tris(3-carboxypropyl)isocyanurate was contained within the range defined in the present disclosure. In Example D26, 5.0% by mass of a bis(2-carboxyethyl) isocyanurate was contained within the range defined in the present disclosure. In Examples A26, B26, C26, and D26, 5.0% by mass of a polymerized rosin as a rosin, 20.0% by mass of an acrylic resin, and 10.0% by mass of an acrylic polyethylene copolymer resin were contained within the range defined in the present disclosure. The total amount of the additional resins was within the range defined in the present disclosure, and the ratio of the acrylic resin to the rosin (acrylic resin/rosin) was 6.0, which was within the range defined in the present disclosure. In addition, 5.0% by mass of an adipic acid and 5.0% by mass of a hydrogenated dimer acid were contained as organic acids within the range defined in the present disclosure. The total amount of the organic acids was within the range defined in the present disclosure. In addition, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained, and 39.0% by mass of a hexyl diglycol as a solvent was contained as a balance thereof, within the range defined in the present disclosure.

In Examples A26, B26, C26, and D26, although the amount of the rosin was decreased within the range defined in the present disclosure, the presence of an acrylic resin as an additional resin allowed the wet-spread diameter of solder to satisfy the above-described evaluation criteria, and thus to realize a sufficient effect in terms of the solder spreadability.

In contrast, in Comparative Example A1, neither tris(2-carboxyethyl)isocyanurate nor other (carboxyalkyl)isocyanurate adducts were contained. In Comparative Example B1, neither tris(1-carboxymethyl)isocyanurate nor other (carboxyalkyl)isocyanurate adducts were contained. In Comparative Example C1, neither tris(3-carboxypropyl)isocyanurate nor other (carboxyalkyl)isocyanurate adducts were contained. In Comparative Example D1, neither bis(2-carboxyethyl)isocyanurate nor other (carboxyalkyl)isocyanurate adducts were contained. In Comparative Examples A1, B1, C1, and D1, 45.0% by mass of a polymerized rosin as a rosin, 5.0% by mass of a glutaric acid as an organic acid, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained, and 39.0% by mass of a hexyl diglycol as a solvent was contained as a balance thereof, within the range defined in the present disclosure.

In Comparative Examples A1, B1, C1, and D1, although the rosin, the organic acid, the amine, the organic halogen compound, the thixo agent, and the solvent were contained within the range defined in the present disclosure, the absence of any of the (carboxyalkyl)isocyanurate adducts did not allow the wet-spread diameter of solder to satisfy the evaluation criteria, and exhibited no effects on the solder spreadability.

In Comparative Example A2, neither tris(2-carboxyethyl) isocyanurate nor other (carboxyalkyl)isocyanurate adducts were contained. In Comparative Example B2, neither tris(1-carboxymethyl)isocyanurate nor other (carboxyalkyl)isocyanurate adducts were contained. In Comparative Example C2, neither tris(3-carboxypropyl)isocyanurate nor other (carboxyalkyl)isocyanurate adducts were contained. In Comparative Example D2, neither bis(2-carboxyethyl)isocyanurate nor other (carboxyalkyl)isocyanurate adducts were contained. In Comparative Examples A2, B2, C2, and D2, 45.0% by mass of a polymerized rosin as a rosin, 5.0% by mass of an adipic acid as an organic acid, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained, and 39.0% by mass of a hexyl diglycol as a solvent was contained as a balance thereof, within the range defined in the present disclosure.

In Comparative Examples A2, B2, C2, and D2, although the rosin, the organic acid, the amine, the organic halogen compound, the thixo agent, and the solvent were contained within the range defined in the present disclosure, and the type of the organic acid was changed, the absence of any of the (carboxyalkyl)isocyanurate adducts did not allow the wet-spread diameter of solder to satisfy the evaluation criteria, and exhibited no effects on the solder spreadability.

Table 9 shows examples in which some of a tris(2-carboxyethyl)isocyanurates, a tris(1-carboxymethyl)isocyanurate, a tris(3-carboxypropyl)isocyanurate, and a bis(2-carboxyethyl)isocyanurate as (carboxyalkyl)isocyanurate adducts were contained in combination, and comparative examples in which none of the (carboxyalkyl)isocyanurate adducts was contained.

In Example E1, 1.25% by mass of a tris(2-carboxyethyl) isocyanurate, 1.25% by mass of a tris(1-carboxymethyl) isocyanurate, 1.25% by mass of a tris(3-carboxypropyl) isocyanurate, and 1.25% by mass of a bis(2-carboxyethyl) isocyanurate were contained within the range defined in the present disclosure. The total amount of the (carboxyalkyl) isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of hexyl diglycol as a solvent was contained as a balance thereof, within the range defined in the present disclosure.

In Example E1 in which plural (carboxyalkyl)isocyanurate adducts were contained in combination, the wet-spread diameter of solder satisfied the above-described evaluation criteria, and thus a sufficient effect was obtained in terms of the solder spreadability.

In Example E2, 2.5% by mass of a tris(2-carboxyethyl) isocyanurate and 2.5% by mass of a tris(1-carboxymethyl) isocyanurate were contained within the range defined in the present disclosure. The total amount of the (carboxyalkyl) isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of a hexyl diglycol as a solvent was contained as a balance thereof, within the range defined in the present disclosure.

In Example E2, the wet-spread diameter of solder satisfied the above-described evaluation criteria, and thus a sufficient effect was obtained in terms of the solder spreadability.

In Example E3, 2.5% by mass of a tris(2-carboxyethyl) isocyanurate and 2.5% by mass of a tris(3-carboxypropyl) isocyanurate were contained within the range defined in the present disclosure. The total amount of the (carboxyalkyl) isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of a hexyl diglycol as a solvent was contained as a balance thereof, within the range defined in the present disclosure.

In Example E3, the wet-spread diameter of solder satisfied the above-described evaluation criteria, and thus a sufficient effect was obtained in terms of the solder spreadability.

In Example E4, 2.5% by mass of a tris(2-carboxyethyl) isocyanurate and 2.5% by mass of a bis(2-carboxyethyl) isocyanurate were contained within the range defined in the present disclosure. The total amount of the (carboxyalkyl) isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of a hexyl diglycol as a solvent was contained as a balance thereof, within the range defined in the present disclosure.

In Example E4, the wet-spread diameter of solder satisfied the above-described evaluation criteria, and thus a sufficient effect was obtained in terms of the solder spreadability.

In Example E5, 2.5% by mass of a tris(1-carboxymethyl)isocyanurate and 2.5% by mass tris(3-carboxypropyl)isocyanurate were contained within the range defined in the present disclosure. The total amount of the (carboxyalkyl)isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of a hexyl diglycol as a solvent was contained as a balance thereof, within the range defined in the present disclosure.

In Example E5, the wet-spread diameter of solder satisfied the above-described evaluation criteria, and thus a sufficient effect was obtained in terms of the solder spreadability.

In Example E6, 2.5% by mass of a tris(1-carboxymethyl)isocyanurate and 2.5% by mass of a bis(2-carboxyethyl)isocyanurate were contained within the range defined in the present disclosure. The total amount of the (carboxyalkyl)isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of a hexyl diglycol as a solvent was contained as a balance thereof, within the range defined in the present disclosure.

In Example E6, the wet-spread diameter of solder satisfied the above-described evaluation criteria, and thus a sufficient effect was obtained in terms of the solder spreadability.

In Example E7, 2.5% by mass of a tris(3-carboxypropyl)isocyanurate and 2.5% by mass of a bis(2-carboxyethyl)isocyanurate were contained within the range defined in the present disclosure. The total amount of the (carboxyalkyl)isocyanurate adducts was 5.0% by mass within the range defined in the present disclosure. In addition, 45.0% by mass of a polymerized rosin was contained as a rosin within the range defined in the present disclosure. In addition, 5.0% by mass of a monoethanolamine as an amine, 1.0% by mass of a trans-2,3-dibromo-1,4-butenediol as an organic halogen compound, and 5% by mass of a hardened castor oil as a thixo agent were contained, and 39.0% by mass of hexyl diglycol as a solvent was contained as a balance thereof, within the range defined in the present disclosure.

In Example E7, the wet-spread diameter of solder satisfied the above-described evaluation criteria, and thus a sufficient effect was obtained in terms of the solder spreadability.

In Example E8, 2.5% by mass of a tris(2-carboxyethyl)isocyanurate, 2.5% by mass of a tris(1-carboxymethyl)isocyanurate, and 2.5% by mass of a tris(3-carboxypropyl)isocyanurate were contained within the range defined in the present disclosure. The total amount of the (carboxyalkyl)isocyanurate adducts was 7.5% by mass within the range defined in the present disclosure. In addition, 45.0% by mass of a polymerized rosin was contained as a rosin within the range defined in the present disclosure. In addition, 3.0% by mass of a monoethanolamine as an amine, 1.0% by mass of a trans-2,3-dibromo-1,4-butenediol as an organic halogen compound, and 5% by mass of a hardened castor oil as a thixo agent were contained, and 38.5% by mass of a hexyl diglycol as a solvent was contained as a balance thereof, within the range defined in the present disclosure.

In Example E8, the wet-spread diameter of solder satisfied the above-described evaluation criteria, and thus a sufficient effect was obtained in terms of the solder spreadability.

In Example E9, 2.5% by mass of a tris(2-carboxyethyl)isocyanurate, 2.5% by mass of a tris(1-carboxymethyl)isocyanurate, and 2.5% by mass of a bis(2-carboxyethyl)isocyanurate were contained within the range defined in the present disclosure. The total amount of the (carboxyalkyl)isocyanurate adducts was 7.5% by mass within the range defined in the present disclosure. In addition, 45.0% by mass of a polymerized rosin was contained as a rosin within the range defined in the present disclosure. In addition, 3.0% by mass of a monoethanolamine as an amine, 1.0% by mass of a trans-2,3-dibromo-1,4-butenediol as an organic halogen compound, and 5% by mass of a hardened castor oil as a thixo agent were contained, and 38.5% by mass of a hexyl diglycol as a solvent was contained as a balance thereof, within the range defined in the present disclosure.

In Example E9, the wet-spread diameter of solder satisfied the above-described evaluation criteria, and thus a sufficient effect was obtained in terms of the solder spreadability.

In Example E10, 2.5% by mass of a tris(2-carboxyethyl)isocyanurate, 2.5% by mass of a tris(3-carboxypropyl)isocyanurate, and 2.5% by mass of a bis(2-carboxyethyl)isocyanurate were contained within the range defined in the present disclosure. The total amount of the (carboxyalkyl)isocyanurate adducts was 7.5% by mass within the range defined in the present disclosure. In addition, 45.0% by mass of a polymerized rosin was contained as a rosin within the range defined in the present disclosure. In addition, 3.0% by mass of a monoethanolamine as an amine, 1.0% by mass of a trans-2,3-dibromo-1,4-butenediol as an organic halogen compound, and 5% by mass of a hardened castor oil as a thixo agent were contained, and 38.5% by mass of a hexyl diglycol as a solvent was contained as a balance thereof, within the range defined in the present disclosure.

In Example E10, the wet-spread diameter of solder satisfied the above-described evaluation criteria, and thus a sufficient effect was obtained in terms of the solder spreadability.

In Example E11, 2.5% by mass of a tris(1-carboxymethyl)isocyanurate, 2.5% by mass of a tris(3-carboxypropyl)isocyanurate, and 2.5% by mass of a bis(2-carboxyethyl)isocyanurate were contained within the range defined in the present disclosure. The total amount of the (carboxyalkyl)isocyanurate adducts was 7.5% by mass within the range defined in the present disclosure. In addition, 45.0% by mass of a polymerized rosin was contained as a rosin within the range defined in the present disclosure. In addition, 3.0% by mass of a monoethanolamine as an amine, 1.0% by mass of a trans-2,3-dibromo-1,4-butenediol as an organic halogen compound, and 5% by mass of a hardened castor oil as a thixo agent were contained, and 38.5% by mass of a hexyl diglycol as a solvent was contained as a balance thereof, within the range defined in the present disclosure.

In Example E11, the wet-spread diameter of solder satisfied the above-described evaluation criteria, and thus a sufficient effect was obtained in terms of the solder spreadability.

In Example E12, 1.25% by mass of a tris(2-carboxyethyl) isocyanurate, 1.25% by mass of a tris(1-carboxymethyl) isocyanurate, 1.25% by mass of a tris(3-carboxypropyl) isocyanurate, and 1.25% by mass of a bis(2-carboxyethyl) isocyanurate were contained within the range defined in the present disclosure. The total amount of the (carboxyalkyl) isocyanurate adducts was 5.0% by mass within the range defined in the present disclosure. In addition, 5.0% by mass of a polymerized rosin, 10.0% by mass of a hydrogenated rosin, and 15.0% by mass of an acid-modified rosin were contained as rosins within the range defined in the present disclosure. The total amount of the rosins was within the range defined in the present disclosure. In addition, 5.0% by mass of an adipic acid and 10.0% by mass of a hydrogenated dimer acid were contained as organic acids within the range defined in the present disclosure. The total amount of the organic acids was within the range defined in the present disclosure. In addition, 5.0% by mass of a 2-phenylimidazole as an amine, 1.0% by mass of a trans-2,3-dibromo-1,4-butenediol as an organic halogen compound, and 5% by mass of a hardened castor oil as a thixo agent were contained, and 39.0% by mass of a hexyl diglycol as a solvent was contained as a balance thereof, within the range defined in the present disclosure.

In Example E12, the wet-spread diameter of solder satisfied the above-described evaluation criteria, and thus a sufficient effect was obtained in terms of the solder spreadability.

In Example E13, 1.25% by mass of a tris(2-carboxyethyl) isocyanurate, 1.25% by mass of a tris(1-carboxymethyl) isocyanurate, 1.25% by mass of a tris(3-carboxypropyl) isocyanurate, and 1.25% by mass of a bis(2-carboxyethyl) isocyanurate were contained within the range defined in the present disclosure. The total amount of the (carboxyalkyl) isocyanurate adducts was 5.0% by mass within the range defined in the present disclosure. In addition, 5.0% by mass of a polymerized rosin as a rosin, 20.0% by mass of an acrylic resin, and 10.0% by mass of an acrylic polyethylene copolymer resin were contained within the range defined in the present disclosure. The total amount of the additional resins was within the range defined in the present disclosure, and the ratio of the acrylic resin to the rosin (acrylic resin/rosin) was 6.0, which was within the range defined in the present disclosure. In addition, 5.0% by mass of an adipic acid and 5.0% by mass of a hydrogenated dimer acid were contained as organic acids within the range defined in the present disclosure. The total amount of the organic acids was within the range defined in the present disclosure. In addition, 1.0% by mass of a diphenylguanidine and 4.0% by mass of a 2-phenyl-4-methylimidazole were contained as amines within the range defined in the present disclosure. The total amount of the amines was within the range defined in the present disclosure. In addition, 1.0% by mass of a trans-2,3-dibromo-1,4-butenediol as an organic halogen compound, and 5.0% by mass of a hardened castor oil as a thixo agent were contained, and 39.0% by mass of a hexyl diglycol as a solvent was contained as a balance thereof, within the range defined in the present disclosure.

In Example E13, the wet-spread diameter of solder satisfied the above-described evaluation criteria, and thus a sufficient effect was obtained in terms of the solder spreadability.

In contrast, in Comparative Example E1, none of tris(2-carboxyethyl)isocyanurate, tris(1-carboxymethyl)isocyanurate, tris(3-carboxypropyl)isocyanurate, and bis(2-carboxyethyl)isocyanurate was contained. 45.0% by mass of a polymerized rosin as a rosin, 5.0% by mass of a glutaric acid as an organic acid, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained, and 39.0% by mass of a hexyl diglycol as a solvent was contained as a balance thereof, within the range defined in the present disclosure.

In Comparative Example E1, although the rosin, the organic acid, the amine, the organic halogen compound, the thixo agent, and the solvent were contained within the range defined in the present disclosure, the absence of any of the (carboxyalkyl)isocyanurate adduct did not allow the wet-spread diameter of solder to satisfy the evaluation criteria, and exhibited no effect on the solder spreadability.

In Comparative Example E2, none of tris(2-carboxyethyl) isocyanurate, tris(1-carboxymethyl)isocyanurate, tris(3-carboxypropyl)isocyanurate, and bis(2-carboxyethyl)isocyanurate was contained. 45.0% by mass of a polymerized rosin as a rosin, 5.0% by mass of an adipic acid as an organic acid, 5.0% by mass of a monoethanolamine as an amine, 1.0% by mass of a trans-2,3-dibromo-1,4-butenediol as an organic halogen compound, and 5.0% by mass of a hardened castor oil as a thixo agent were contained, and 39.0% by mass of a hexyl diglycol as a solvent was contained as a balance thereof, within the range defined in the present disclosure.

In Comparative Example E2, although the rosin, the organic acid, the amine, the organic halogen compound, the thixo agent, and the solvent were contained within the range defined in the present disclosure, and the type of organic acid was changed, the absence of any of the (carboxyalkyl) isocyanurate adducts did not allow the wet-spread diameter of solder to satisfy the evaluation criteria, and exhibited no effects on the solder spreadability.

<Evaluation Relating to Viscosity-Increase Suppression Effect of Solder Paste (Change Over Time)>

The viscosity-increase suppression effects of solder pastes prepared using the flux prepared in Example E12 and solder alloys each having a constitution shown in Tables 10 to 15 were evaluated. In Example E12, a tris(2-carboxyethyl) isocyanurate, a tris(1-carboxymethyl)isocyanurate, a tris(3-carboxypropyl)isocyanurate and a bis(2-carboxyethyl)isocyanurate were formulated as (carboxyalkyl)isocyanurate adducts, and no acrylic resin was formulated. The flux prepared in Example E12 as shown in Table 9 was mixed with each solder powder having both an alloy constitution shown in Tables 10 to 15 and a size (grain size distribution) satisfying Symbol 4 in the powder size classification (Table 2) in JIS Z 3284-1: 2014 to produce each solder paste. In the solder paste, the amount of the flux was 11% by mass, and the amount of the solder powder was 89% by mass.

(1) Evaluation Method

The viscosity of the resultant solder paste was measured for 12 hours at a rotation frequency of 10 rpm and a measurement temperature of 25° C. using a rotational viscometer (PCU-205 manufactured by Malcolm Co., Ltd.) according to the method described in "4.2 Test for Viscosity Characteristics" of JIS Z 3284-3:2014. An initial viscosity (viscosity after conducting stirring for 30 minutes) was compared with a viscosity after 12 hours to evaluate the viscosity-increase suppression effect based on the following criteria.

(2) Evaluation Criteria

A: Viscosity after 12 hours≤initial viscosity×1.2: Favorable due to small increase in viscosity over time B: Viscosity after 12 hours>initial viscosity×1.2: Unfavorable due to large increase in viscosity over time

TABLE 10

| | Alloy constitution (ppm by mass) | | | | | Formula | Formula | Evaluation item Change |
|---|---|---|---|---|---|---|---|---|
| | Sn | As | Sb | Bi | Pb | (1) | (2) | over time |
| Example 1A | Bal | 100 | 25 | 25 | 25 | 275 | 4.50 | A |
| Example 2A | Bal | 100 | 50 | 25 | 0 | 275 | 10.00 | A |
| Example 3A | Bal | 100 | 0 | 75 | 0 | 275 | 2.67 | A |
| Example 4A | Bal | 100 | 0 | 0 | 75 | 275 | 2.67 | A |
| Example 5A | Bal | 100 | 50 | 50 | 50 | 350 | 2.50 | A |
| Example 6A | Bal | 50 | 100 | 100 | 50 | 350 | 1.33 | A |
| Example 7A | Bal | 300 | 0 | 300 | 300 | 1,200 | 1.00 | A |
| Example 8A | Bal | 200 | 300 | 250 | 250 | 1,200 | 1.40 | A |
| Example 9A | Bal | 100 | 500 | 250 | 250 | 1,200 | 1.40 | A |
| Example 10A | Bal | 200 | 50 | 600 | 850 | 1,900 | 0.31 | A |
| Example 11A | Bal | 200 | 500 | 500 | 500 | 1,900 | 0.90 | A |
| Example 12A | Bal | 200 | 500 | 1,000 | 0 | 1,900 | 0.90 | A |
| Example 13A | Bal | 200 | 500 | 0 | 1,000 | 1,900 | 0.90 | A |
| Example 14A | Bal | 25 | 500 | 350 | 1,000 | 1,900 | 0.41 | A |
| Example 15A | Bal | 100 | 3,000 | 300 | 300 | 3,800 | 5.33 | A |
| Example 16A | Bal | 100 | 0 | 0 | 5,100 | 5,300 | 0.04 | A |
| Example 17A | Bal | 100 | 0 | 10,000 | 0 | 10,200 | 0.02 | A |
| Example 18A | Bal | 100 | 0 | 10,000 | 5,000 | 15,200 | 0.01 | A |
| Comparative Example 1A | Bal. | <u>0</u> | 100 | 100 | 100 | 300 | 0.50 | B |
| Comparative Example 2A | Bal | 25 | 25 | 25 | 25 | <u>125</u> | 1.50 | B |

The underlines indicate that the numerical values were out of the ranges according to the present invention.

TABLE 11

| | Alloy constitution (ppm by mass for As, Bi, and Pb, and % by mass for Cu) | | | | | | Formula | Formula | Evaluation item Change |
|---|---|---|---|---|---|---|---|---|---|
| | Sn | Cu | As | Sb | Bi | Pb | (1) | (2) | over time |
| Example 19A | Bal | 0.7 | 100 | 25 | 25 | 25 | 275 | 4.50 | A |
| Example 20A | Bal | 0.7 | 100 | 50 | 25 | 0 | 275 | 10.00 | A |
| Example 21A | Bal | 0.7 | 100 | 0 | 75 | 0 | 275 | 2.67 | A |
| Example 22A | Bal | 0.7 | 100 | 0 | 0 | 75 | 275 | 2.67 | A |
| Example 23A | Bal | 0.7 | 100 | 50 | 50 | 50 | 350 | 2.50 | A |
| Example 24A | Bal | 0.7 | 50 | 100 | 100 | 50 | 350 | 1.33 | A |
| Example 25A | Bal | 0.7 | 300 | 0 | 300 | 300 | 1,200 | 1.00 | A |
| Example 26A | Bal | 0.7 | 200 | 300 | 250 | 250 | 1,200 | 1.40 | A |
| Example 27A | Bal | 0.7 | 100 | 500 | 250 | 250 | 1,200 | 1.40 | A |
| Example 28A | Bal | 0.7 | 200 | 50 | 600 | 850 | 1,900 | 0.31 | A |
| Example 29A | Bal | 0.7 | 200 | 500 | 500 | 500 | 1,900 | 0.90 | A |
| Example 30A | Bal | 0.7 | 200 | 500 | 1,000 | 0 | 1,900 | 0.90 | A |
| Example 31A | Bal | 0.7 | 200 | 500 | 0 | 1,000 | 1,900 | 0.90 | A |
| Example 32A | Bal | 0.7 | 25 | 500 | 350 | 1,000 | 1,900 | 0.41 | A |
| Example 33A | Bal | 0.7 | 100 | 3,000 | 300 | 300 | 3,800 | 5.33 | A |
| Example 34A | Bal | 0.7 | 100 | 0 | 0 | 5,100 | 5,300 | 0.04 | A |
| Example 35A | Bal | 0.7 | 100 | 0 | 10,000 | 0 | 10,200 | 0.02 | A |
| Example 36A | Bal | 0.7 | 100 | 0 | 10,000 | 5,000 | 15,200 | 0.01 | A |
| Comparative Example 3A | Bal. | 0.7 | <u>0</u> | 100 | 100 | 100 | 300 | 0.50 | B |
| Comparative Example 4A | Bal | 0.7 | 25 | 25 | 25 | 25 | <u>125</u> | 1.50 | B |

The underlines indicate that the numerical values were out of the ranges according to the present invention.

TABLE 12

| | Alloy constitution (ppm by mass for As, Sb, Bi, and Pb, and % by mass for Ag and Cu) | | | | | | Formula | Formula | Evaluation item Change |
|---|---|---|---|---|---|---|---|---|---|
| | Sn | Ag | Cu | As | Sb | Bi | Pb | (1) | (2) | over time |
| Example 37A | Bal | 1 | 0.5 | 100 | 25 | 25 | 25 | 275 | 4.50 | A |
| Example 38A | Bal | 1 | 0.5 | 100 | 50 | 25 | 0 | 275 | 10.00 | A |
| Example 39A | Bal | 1 | 0.5 | 100 | 0 | 75 | 0 | 275 | 2.67 | A |
| Example 40A | Bal | 1 | 0.5 | 100 | 0 | 0 | 75 | 275 | 2.67 | A |
| Example 41A | Bal | 1 | 0.5 | 100 | 50 | 50 | 50 | 350 | 2.50 | A |
| Example 42A | Bal | 1 | 0.5 | 50 | 100 | 100 | 50 | 350 | 1.33 | A |
| Example 43A | Bal | 1 | 0.5 | 300 | 0 | 300 | 300 | 1,200 | 1.00 | A |
| Example 44A | Bal | 1 | 0.5 | 200 | 300 | 250 | 250 | 1,200 | 1.40 | A |
| Example 45A | Bal | 1 | 0.5 | 100 | 500 | 250 | 250 | 1,200 | 1.40 | A |
| Example 46A | Bal | 1 | 0.5 | 200 | 50 | 600 | 850 | 1,900 | 0.31 | A |
| Example 47A | Bal | 1 | 0.5 | 200 | 500 | 500 | 500 | 1,900 | 0.90 | A |
| Example 48A | Bal | 1 | 0.5 | 200 | 500 | 1,000 | 0 | 1,900 | 0.90 | A |
| Example 49A | Bal | 1 | 0.5 | 200 | 500 | 0 | 1,000 | 1,900 | 0.90 | A |
| Example 50A | Bal | 1 | 0.5 | 25 | 500 | 350 | 1,000 | 1,900 | 0.41 | A |
| Example 51A | Bal | 1 | 0.5 | 100 | 3,000 | 300 | 300 | 3,800 | 5.33 | A |
| Example 52A | Bal | 1 | 0.5 | 100 | 0 | 0 | 5,100 | 5,300 | 0.04 | A |
| Example 53A | Bal | 1 | 0.5 | 100 | 0 | 10,000 | 0 | 10,200 | 0.02 | A |
| Example 54A | Bal | 1 | 0.5 | 100 | 0 | 10,000 | 5,000 | 15,200 | 0.01 | A |
| Comparative Example 5A | Bal. | 1 | 0.5 | <u>0</u> | 100 | 100 | 100 | 300 | 0.50 | B |
| Comparative Example 6A | Bal | 1 | 0.5 | 25 | 25 | 25 | 25 | <u>125</u> | 1.50 | B |

The underlines indicate that the numerical values were out of the ranges according to the present invention.

TABLE 13

| | Alloy constitution (ppm by mass for As, Sb, Bi, and Pb, and % by mass for Ag and Cu) | | | | | | Formula | Formula | Evaluation item Change |
|---|---|---|---|---|---|---|---|---|---|
| | Sn | Ag | Cu | As | Sb | Bi | Pb | (1) | (2) | over time |
| Example 55A | Bal | 2 | 0.5 | 100 | 25 | 25 | 25 | 275 | 4.50 | A |
| Example 56A | Bal | 2 | 0.5 | 100 | 50 | 25 | 0 | 275 | 10.00 | A |
| Example 57A | Bal | 2 | 0.5 | 100 | 0 | 75 | 0 | 275 | 2.67 | A |
| Example 58A | Bal | 2 | 0.5 | 100 | 0 | 0 | 75 | 275 | 2.67 | A |
| Example 59A | Bal | 2 | 0.5 | 100 | 50 | 50 | 50 | 350 | 2.50 | A |
| Example 60A | Bal | 2 | 0.5 | 50 | 100 | 100 | 50 | 350 | 1.33 | A |
| Example 61A | Bal | 2 | 0.5 | 300 | 0 | 300 | 300 | 1,200 | 1.00 | A |
| Example 62A | Bal | 2 | 0.5 | 200 | 300 | 250 | 250 | 1,200 | 1.40 | A |
| Example 63A | Bal | 2 | 0.5 | 100 | 500 | 250 | 250 | 1,200 | 1.40 | A |
| Example 64A | Bal | 2 | 0.5 | 200 | 50 | 600 | 850 | 1,900 | 0.31 | A |
| Example 65A | Bal | 2 | 0.5 | 200 | 500 | 500 | 500 | 1,900 | 0.90 | A |
| Example 66A | Bal | 2 | 0.5 | 200 | 500 | 1,000 | 0 | 1,900 | 0.90 | A |
| Example 67A | Bal | 2 | 0.5 | 200 | 500 | 0 | 1,000 | 1,900 | 0.90 | A |
| Example 68A | Bal | 2 | 0.5 | 25 | 500 | 350 | 1,000 | 1,900 | 0.41 | A |
| Example 69A | Bal | 2 | 0.5 | 100 | 3,000 | 300 | 300 | 3,800 | 5.33 | A |
| Example 70A | Bal | 2 | 0.5 | 100 | 0 | 0 | 5,100 | 5,300 | 0.04 | A |
| Example 71A | Bal | 2 | 0.5 | 100 | 0 | 10,000 | 0 | 10,200 | 0.02 | A |
| Example 72A | Bal | 2 | 0.5 | 100 | 0 | 10,000 | 5,000 | 15,200 | 0.01 | A |
| Comparative Example 7A | Bal. | 2 | 0.5 | <u>0</u> | 100 | 100 | 100 | 300 | 0.50 | B |
| Comparative Example 8A | Bal | 2 | 0.5 | 25 | 25 | 25 | 25 | <u>125</u> | 1.50 | B |

The underlines indicate that the numerical values were out of the ranges according to the present invention.

TABLE 14

| | Alloy constitution (ppm by mass for As, Sb, Bi, and Pb, and % by mass for Ag and Cu) | | | | | | | Formula (1) | Formula (2) | Evaluation item Change over time |
|---|---|---|---|---|---|---|---|---|---|---|
| | Sn | Ag | Cu | As | Sb | Bi | Pb | | | |
| Example 73A | Bal | 3 | 0.5 | 100 | 25 | 25 | 25 | 275 | 4.50 | A |
| Example 74A | Bal | 3 | 0.5 | 100 | 50 | 25 | 0 | 275 | 10.00 | A |
| Example 75A | Bal | 3 | 0.5 | 100 | 0 | 75 | 0 | 275 | 2.67 | A |
| Example 76A | Bal | 3 | 0.5 | 100 | 0 | 0 | 75 | 275 | 2.67 | A |
| Example 77A | Bal | 3 | 0.5 | 100 | 50 | 50 | 50 | 350 | 2.50 | A |
| Example 78A | Bal | 3 | 0.5 | 50 | 100 | 100 | 50 | 350 | 1.33 | A |
| Example 79A | Bal | 3 | 0.5 | 300 | 0 | 300 | 300 | 1,200 | 1.00 | A |
| Example 80A | Bal | 3 | 0.5 | 200 | 300 | 250 | 250 | 1,200 | 1.40 | A |
| Example 81A | Bal | 3 | 0.5 | 100 | 500 | 250 | 250 | 1,200 | 1.40 | A |
| Example 82A | Bal | 3 | 0.5 | 200 | 50 | 600 | 850 | 1,900 | 0.31 | A |
| Example 83A | Bal | 3 | 0.5 | 200 | 500 | 500 | 500 | 1,900 | 0.90 | A |
| Example 84A | Bal | 3 | 0.5 | 200 | 500 | 1,000 | 0 | 1,900 | 0.90 | A |
| Example 85A | Bal | 3 | 0.5 | 200 | 500 | 0 | 1,000 | 1,900 | 0.90 | A |
| Example 86A | Bal | 3 | 0.5 | 25 | 500 | 350 | 1,000 | 1,900 | 0.41 | A |
| Example 87A | Bal | 3 | 0.5 | 100 | 3,000 | 300 | 300 | 3,800 | 5.33 | A |
| Example 88A | Bal | 3 | 0.5 | 100 | 0 | 0 | 5,100 | 5,300 | 0.04 | A |
| Example 89A | Bal | 3 | 0.5 | 100 | 0 | 10,000 | 0 | 10,200 | 0.02 | A |
| Example 90A | Bal | 3 | 0.5 | 100 | 0 | 10,000 | 5,000 | 15,200 | 0.01 | A |
| Comparative Example 9A | Bal. | 3 | 0.5 | <u>0</u> | 100 | 100 | 100 | 300 | 0.50 | B |
| Comparative Example 10A | Bal | 3 | 0.5 | 25 | 25 | 25 | 25 | <u>125</u> | 1.50 | B |

The underlines indicate that the numerical values were out of the ranges according to the present invention.

TABLE 15

| | Alloy constitution (ppm by mass for As, Sb, Bi, and Pb, and % by mass for Ag and Cu) | | | | | | | Formula (1) | Formula (2) | Evaluation item Change over time |
|---|---|---|---|---|---|---|---|---|---|---|
| | Sn | Ag | Cu | As | Sb | Bi | Pb | | | |
| Example 91A | Bal | 3.5 | 0.5 | 100 | 25 | 25 | 25 | 275 | 4.50 | A |
| Example 92A | Bal | 3.5 | 0.5 | 100 | 50 | 25 | 0 | 275 | 10.00 | A |
| Example 93A | Bal | 3.5 | 0.5 | 100 | 0 | 75 | 0 | 275 | 2.67 | A |
| Example 94A | Bal | 3.5 | 0.5 | 100 | 0 | 0 | 75 | 275 | 2.67 | A |
| Example 95A | Bal | 3.5 | 0.5 | 100 | 50 | 50 | 50 | 350 | 2.50 | A |
| Example 96A | Bal | 3.5 | 0.5 | 50 | 100 | 100 | 50 | 350 | 1.33 | A |
| Example 97A | Bal | 3.5 | 0.5 | 300 | 0 | 300 | 300 | 1,200 | 1.00 | A |
| Example 98A | Bal | 3.5 | 0.5 | 200 | 300 | 250 | 250 | 1,200 | 1.40 | A |
| Example 99A | Bal | 3.5 | 0.5 | 100 | 500 | 250 | 250 | 1,200 | 1.40 | A |
| Example 100A | Bal | 3.5 | 0.5 | 200 | 50 | 600 | 850 | 1,900 | 0.31 | A |
| Example 101A | Bal | 3.5 | 0.5 | 200 | 500 | 500 | 500 | 1,900 | 0.90 | A |
| Example 102A | Bal | 3.5 | 0.5 | 200 | 500 | 1,000 | 0 | 1,900 | 0.90 | A |
| Example 103A | Bal | 3.5 | 0.5 | 200 | 500 | 0 | 1,000 | 1,900 | 0.90 | A |
| Example 104A | Bal | 3.5 | 0.5 | 25 | 500 | 350 | 1,000 | 1,900 | 0.41 | A |
| Example 105A | Bal | 3.5 | 0.5 | 100 | 3,000 | 300 | 300 | 3,800 | 5.33 | A |
| Example 106A | Bal | 3.5 | 0.5 | 100 | 0 | 0 | 5,100 | 5,300 | 0.04 | A |
| Example 107A | Bal | 3.5 | 0.5 | 100 | 0 | 10,000 | 0 | 10,200 | 0.02 | A |
| Example 108A | Bal | 3.5 | 0.5 | 100 | 0 | 10,000 | 5,000 | 15,200 | 0.01 | A |
| Comparative Example 11A | Bal. | 3.5 | 0.5 | <u>0</u> | 100 | 100 | 100 | 300 | 0.50 | B |
| Comparative Example 12A | Bal | 3.5 | 0.5 | 25 | 25 | 25 | 25 | <u>125</u> | 1.50 | B |

The underlines indicate that the numerical values were out of the ranges according to the present invention.

The solder pastes prepared using the flux of Example E12 shown in Table 9 with each solder alloy of Examples 1A to 108A shown in Tables 10 to 15 satisfying the formulae (1) and (2) satisfied all the requirements according to the present invention in any alloy constitutions in addition to the solder spreadability, and therefore, the viscosity-increase suppression effects of the solder pastes were sufficiently obtained. DSC of the solder powders of Examples 1A to 108A before being mixed with the flux was measured using EXSTAR DSC7020 (model number) manufactured by SII NanoTechnology Inc., in a sample amount of about 30 mg and at a rate of temperature increase of 15° C./min to obtain a solidus temperature and a liquidus-line temperature. The obtained solidus temperature was subtracted from the obtained liquidus-line temperature to determine ΔT. In all of the examples, ΔT was less than or equal to 10° C., which was within a suitable range.

In contrast, the solder pastes prepared using the flux of Example E12 shown in Table 9 with the solder alloys of Comparative Examples 1A, 3A, 5A, 7A, 9A, and 11A shown in Tables 10 to 15, in which As was not contained, did not exhibit the viscosity-increase suppression effect.

The solder pastes prepared using the flux of Example E12 shown in Table 9 with the solder alloys of Comparative Examples 2A, 4A, 6A, 8A, 10A, and 12A shown in Tables 10 to 15, in which the value determined by the formula (1) was less than the lower limit, did not exhibit the viscosity-increase suppression effect.

In addition, Examples 19A, 20A, 33A, and 36A, and Comparative Examples 3A and 4A, are respectively referred to as Examples BB1, BB2, BB3, and BB4, and Comparative Examples BB1 and BB2. In addition, Examples 73A, 74A, 86A, 87A, 90A, and Comparative Examples 9A and 10A are respectively referred to as Examples CC1, CC2, CC3, CC4, and CC5, and Comparative Examples CC1 and CC2.

TABLE 16

| | Alloy constitution (ppm by mass for As, Sb, Bi, and Pb, and % by mass for Ag and Cu) | | | | | | | Formula (1) | Formula (2) | Evaluation item Change over time |
|---|---|---|---|---|---|---|---|---|---|---|
| | Sn | Ag | Cu | As | Sb | Bi | Pb | | | |
| Example AA1 | Bal | 0 | 0 | 100 | 25 | 25 | 25 | 275 | 4.50 | A |
| Example AA2 | Bal | 0 | 0 | 100 | 50 | 25 | 0 | 275 | 10.00 | A |
| Example AA3 | Bal | 0 | 0 | 100 | 3,000 | 300 | 300 | 3,800 | 5.33 | A |
| Example AA4 | Bal | 0 | 0 | 100 | 0 | 10,000 | 5,000 | 15,200 | 0.01 | A |
| Comparative Example AA1 | Bal | 0 | 0 | 0 | 100 | 100 | 100 | 300 | 0.50 | B |
| Comparative Example AA2 | Bal | 0 | 0 | 25 | 25 | 25 | 25 | 125 | 1.50 | B |
| Example BB1 | Bal | 0 | 0.7 | 100 | 25 | 25 | 25 | 275 | 4.50 | A |
| Example BB2 | Bal | 0 | 0.7 | 100 | 50 | 25 | 0 | 275 | 10.00 | A |
| Example BB3 | Bal | 0 | 0.7 | 100 | 3,000 | 300 | 300 | 3,800 | 5.33 | A |
| Example BB4 | Bal | 0 | 0.7 | 100 | 0 | 10,000 | 5,000 | 15,200 | 0.01 | A |
| Comparative Example BB1 | Bal | 0 | 0.7 | 0 | 100 | 100 | 100 | 300 | 0.50 | B |
| Comparative Example BB2 | Bal | 0 | 0.7 | 25 | 25 | 25 | 25 | 125 | 1.50 | B |
| Example CC1 | Bal | 3 | 0.5 | 100 | 25 | 25 | 25 | 275 | 4.50 | A |
| Example CC2 | Bal | 3 | 0.5 | 100 | 50 | 25 | 0 | 275 | 10.00 | A |
| Example CC3 | Bal | 3 | 0.5 | 25 | 500 | 350 | 1,000 | 1,800 | 0.41 | A |
| Example CC4 | Bal | 3 | 0.5 | 100 | 3,000 | 300 | 300 | 3,800 | 5.33 | A |
| Example CC5 | Bal | 3 | 0.5 | 100 | 0 | 10,000 | 5,000 | 15,200 | 0.01 | A |
| Comparative Example CC1 | Bal | 3 | 0.5 | 0 | 100 | 100 | 100 | 300 | 0.50 | B |
| Comparative Example CC2 | Bal | 3 | 0.5 | 25 | 25 | 25 | 25 | 125 | 1.50 | B |

Next, the viscosity-increase suppression effect of solder pastes, each prepared using the flux of Examples A10, A26, B10, B26, C10, C26, D10, D26, or E13, shown in Tables 1 to 9, with solder alloys having a constitution shown in the following Table 16, was evaluated. In Example A10, a tris(2-carboxyethyl)isocyanurate was formulated as a (carboxyalkyl)isocyanurate adduct, and no acrylic resin was formulated. In Example A26, a tris(2-carboxyethyl)isocyanurate and an acrylic resin were formulated. In Example B10, a tris(1-carboxymethyl)isocyanurate was formulated as a (carboxyalkyl)isocyanurate adduct, and no acrylic resin was formulated. In Example B26, a tris(1-carboxymethyl)isocyanurate and an acrylic resin were formulated. In Example C10, a tris(3-carboxypropyl)isocyanurate was formulated as a (carboxyalkyl)isocyanurate adduct, and no acrylic resin was formulated. In Example C26, a tris(3-carboxypropyl)isocyanurate and an acrylic resin were formulated. In Example D10, a bis(2-carboxyethyl)isocyanurate was formulated as a (carboxyalkyl)isocyanurate adduct, and no acrylic resin was formulated. In Example D26, a bis(2-carboxyethyl)isocyanurate and an acrylic resin were formulated. In Example E13, a tris(2-carboxyethyl)isocyanurate, a tris(1-carboxymethyl)isocyanurate, a tris(3-carboxypropyl)isocyanurate and a bis(2-carboxyethyl)isocyanurate were formulated as (carboxyalkyl)isocyanurate adducts and an acrylic resin was formulated.

In Table 16, Examples 1A, 2A, 15A, and 18A, and Comparative Examples 1A and 2A, shown in Tables 10 to 15, are respectively referred to as Examples AA1, AA2, AA3, and AA4, and Comparative Example AA1 and AA2.

Not only the solder pastes prepared using the flux of Example 12 shown in Table 9, but also the solder pastes each prepared using the flux of the examples shown in Tables 1 to 9 with the solder alloy of the examples shown in Table 16 in which the formulae (1) and (2) were satisfied exhibited sufficient effects of suppressing the viscosity-increase in the solder pastes in addition to the solder spreadability.

In contrast, the solder pastes each prepared using the flux of the example shown in Tables 1 to 9 with the solder alloy of Comparative Example AA1, BB1, or CC1, shown in Table 16, in which no As was formulated, did not exhibit the viscosity-increase suppression effect.

The solder pastes each prepared using the flux of the examples shown in Tables 1 to 9 with the solder alloy of Comparative Example AA2, BB2, or CC2 shown in Table 16, in which the value determined by the formula (1) was less than the lower limit, did not exhibit the viscosity-increase suppression effect.

Thus, it was confirmed that the effect of removing oxidized materials in a determined temperature region was increased by the flux containing 0.5% by mass to 20.0% by mass of a (carboxyalkyl)isocyanurate adduct, 5.0% by mass to 50.0% by mass of a rosin, and a solvent.

Thus, the oxidized materials that could be a factor causing poor wetting of solder were removed by conducting soldering in a reflow furnace using the solder paste containing the flux, thereby improving the solder spreadability These effects were not inhibited by incorporation of the acrylic resin, the additional organic acid different from the (carboxyalkyl)isocyanurate adducts, the amine, the organic halogen compound, the amine halogenated hydroacid salt, and the thixo agent, which were arbitrarily added to the flux to improve the solder spreadability, within the range defined in the present disclosure.

In addition, the solder spreadability was not suppressed even by the presence of the (carboxyalkyl)isocyanurate adduct in the solder paste containing the flux and a solder paste consisting of: 25 ppm by mass to 300 ppm by mass of As; at least one selected from the group consisting of more than 0 ppm by mass and no more than 3000 ppm by mass of Sb, more than 0 ppm by mass and no more than 10000 ppm by mass of Bi, and more than 0 ppm by mass and no more than 5100 ppm by mass of Pb; 0% by mass to 4% by mass of Ag; 0% by mass to 0.9% by mass of Cu; and a balance of Sn, in which the formulae (1) and (2) were satisfied, and the viscosity-increase suppression effect was sufficiently exhibited.

Even in the case of using a solder paste containing a flux containing at least one (carboxyalkyl)isocyanurate adduct selected from the group consisting of tris(2-carboxyethyl) isocyanurate, tris(1-carboxymethyl)isocyanurate, tris(3-carboxypropyl)isocyanurate, and bis(2-carboxyethyl)isocyanurate within the range defined in the present disclosure, the viscosity-increase suppression effect was sufficiently exhibited by using the solder alloy in which As, Sb, Bi and Pb were contained within the range defined in the present disclosure, particularly.

Thus, the presence of a (2-carboxyalkyl)isocyanurate adduct in the flux makes it possible to remove oxidized materials that may cause poor wetting of solder when soldering is conducted in a reflow furnace using the solder paste containing the flux, thereby improving the solder spreadability. In addition, the presence of the metal powder having the alloy constitution in the solder paste contributes to suppression of viscosity-increase in the solder paste.

What is claimed is:

1. A solder paste comprising a flux and a metal powder, wherein
    the flux comprises, relative to a total mass of the flux, 0.5% by mass to 20.0% by mass of a (carboxyalkyl) isocyanurate adduct, 0.1% by mass to 10.0% by mass of an amine, 5.0% by mass to 50.0% by mass of a rosin, 5% by mass to 10.0% by mass of an additional organic acid different from the (carboxyalkyl) isocyanurate adduct, 1% by mass to 5.0% by mass of an organic halogen compound, 1% by mass to 5.0% by mass of an amine halogenated hydroacid salt, 5% by mass to 10.0% by mass of a thixo agent, and a solvent, and
    the metal powder consists of a solder alloy having an alloy constitution comprising: 25 ppm by mass to 300 ppm by mass of As; at least one selected from the group consisting of more than 0 ppm by mass and no more than 3000 ppm by mass of Sb, more than 0 ppm by mass and no more than 10000 ppm by mass of Bi, and more than 0 ppm by mass and no more than 5100 ppm by mass of Pb; and a balance of Sn, and satisfying formulae (1) and (2):

$$275 \leqq 2As + Sb + Bi + Pb \quad (1)$$

$$0.01 \leqq (2As + Sb)/(Bi + Pb) \leqq 10.00 \quad (2)$$

in the formulae (1) and (2), As, Sb, Bi, and Pb each independently represents an amount (ppm by mass) thereof in the alloy constitution.

2. The solder paste according to claim 1, wherein the alloy constitution further satisfies formula (1a):

$$275 \leqq 2As + Sb + Bi + Pb \leqq 25200 \quad (1a)$$

in the formula (1a), As, Sb, Bi, and Pb each independently represents an amount (ppm by mass) thereof in the alloy constitution.

3. The solder paste according to claim 1, wherein the alloy constitution further satisfies the formula (1b):

$$275 \leqq 2As + Sb + Bi + Pb \leqq 5300 \quad (1b)$$

in the formula (1b), As, Bi, and Pb each independently represents an amount (ppm by mass) thereof in the alloy constitution.

4. The solder paste according to claim 1, wherein the alloy constitution further satisfies the formula (2a):

$$0.31 \leqq (2As + Sb)/(Bi + Pb) \leqq 10.00 \quad (2a)$$

in the formula (2a), As, Sb, Bi, and Pb each independently represents an amount (ppm by mass) thereof in the alloy constitution.

5. The solder paste according to claim 1, wherein the alloy constitution further comprises at least one selected from the group consisting of 1% by mass to 4% by mass of Ag and 0.5% by mass to 0.9% by mass of Cu.

6. The solder paste according to claim 1, wherein the (carboxyalkyl) isocyanurate adduct is at least one selected from the group consisting of mono(carboxyalkyl) isocyanurate adducts, bis(carboxyalkyl) isocyanurate adducts and tris(carboxyalkyl) isocyanurate adducts.

7. The solder paste according to claim 6, where the tris(carboxyalkyl) isocyanurate adducts are a tris(2-carboxyethyl) isocyanurate, a tris(1-carboxymethyl) isocyanurate, and a tris(3-carboxypropyl) isocyanurate and one of the bis(carboxyalkyl) isocyanurate adducts is a bis(2-carboxyethyl) isocyanurate.

8. The solder paste according to claim 1, further comprising 5% by mass to 30.0% by mass of an additional resin different from the rosin, relative to a total mass of the flux, and the additional resin is an acrylic resin.

* * * * *